United States Patent [19]
Atkins

[11] Patent Number: 5,852,811
[45] Date of Patent: *Dec. 22, 1998

[54] METHOD FOR MANAGING FINANCIAL ACCOUNTS BY A PREFERRED ALLOCATION OF FUNDS AMONG ACCOUNTS

[75] Inventor: Charles Agee Atkins, Charleston, S.C.

[73] Assignee: Proprietary Financial Products, Inc., Charleston, S.C.

[*] Notice: This patent issued on a continued prosecution application filed under 37 CFR 1.53(d), and is subject to the twenty year patent term provisions of 35 U.S.C. 154(a)(2).

[*] Notice: The term of this patent shall not extend beyond the expiration date of Pat. No. 4,953,085.

[21] Appl. No.: 280,096

[22] Filed: Jul. 25, 1994

Related U.S. Application Data

[63] Continuation of Ser. No. 780,590, Oct. 23, 1991, which is a continuation-in-part of Ser. No. 686,319, Apr. 16, 1991, which is a continuation of Ser. No. 408,173, Sep. 15, 1989, abandoned, which is a continuation of Ser. No. 38,817, Apr. 15, 1987, Pat. No. 4,953,085.

[51] Int. Cl.$^6$ ..................................................... G06F 17/60
[52] U.S. Cl. ............................... 705/36; 705/35; 705/37; 705/38
[58] Field of Search .................................... 364/401, 408; 705/35, 36, 37, 38

[56] References Cited

U.S. PATENT DOCUMENTS

| | | |
|---|---|---|
| 3,634,669 | 1/1972 | Soumas . |
| 3,697,693 | 10/1972 | Deschenes . |
| 4,334,270 | 6/1982 | Towers . |
| 4,346,442 | 8/1982 | Musmanno . |
| 4,376,978 | 3/1983 | Musmanno . |
| 4,597,046 | 6/1986 | Musmanno . |
| 4,642,767 | 2/1987 | Lerner . |
| 4,722,055 | 1/1988 | Roberts . |
| 4,742,457 | 5/1988 | Leon . |
| 4,752,877 | 6/1988 | Musmanno . |
| 4,774,663 | 9/1988 | Musmanno . |

OTHER PUBLICATIONS

Clay, John R., Kaun, William J., Meir, Ronald P., Miller, Larry, Tataryn, Dwain K., *Guide to Personal Financial Planning*, (Practitioners Publishing Company, Inc. 1992 Vols. 1 & 2.

Woodwell, Donald R., *Automating Your Financial Portfolio*, (Dow–Jones–Irwin 1983) chapters 1,3,6,9,10,14.

(List continued on next page.)

*Primary Examiner*—Emanuel Todd Voeltz
*Assistant Examiner*—William N. Hughet
*Attorney, Agent, or Firm*—Pennie & Edmonds LLP

[57] ABSTRACT

A personal financial program is disclosed incorporating means of implementing, coordinating, supervising, planning, analyzing and reporting upon investments in an array of asset accounts and liability accounts within a client account. Through a prioritization function, the client specifies his financial objectives, his risk preference, a forecast of economic and financial variables, and budgetary constraints. The prioritization function suggests to the client a portfolio of asset and liability accounts that may be credited and debited to form investments and borrowings to best realize his financial objectives over a defined time horizon. In the preferred embodiment a central structural element of the financial account is a liability account secured by the client's home and one or more asset accounts. Client funds that would normally be used to amortize the mortgage may be alternatively used according to a prioritized allocation of funds to asset accounts and liability accounts. The client account is imbalanced if the client's borrowing power is less than the minimum borrowing power specified by the financial institution. If the account is imbalanced, the client may reallocate the assets and liabilities within the client account and/or modify a set of constraints on the client account. If the client account is still not balanced after modification of the account, the system initiates a liquidation procedure.

39 Claims, 17 Drawing Sheets

OTHER PUBLICATIONS

"Funds Allocation System", Software Update, International Business Machines Corporation, 1985.

"Analysis Extension", Execucom Systems Corporation, 1986.

"Dialing for Profits", Personal Computing, May 1986, p. 180.

"A Financial Planner With Nerves of Silicon", Business Weeks, Oct. 2, 1985, p. 108.

"Learing About Artificial Intelligence", Institutional Investor, Jul. 1986, p. 209.

"What the Taxman Giveth, The Taxman Taketh Away", Financial Times, Mar. 12, 1984, p. 10.

"A Home Found for Your Money", Financial Times, Feb. 1, 1986, p. XI.

"Well Endowed? Don't Believe It", Financial Times, Jun. 29, 1985, p. VIII.

Bierman, harold, Bonini, Charles P., Hausman, Warren H., *Quantitative Analysis for Business Decisions,* (Irwin, Inc. 1977), Chapters 10, 12, 24.

Fleet Norstar Financial Group, "Westminster Account" brochure.

"Information Technology: Learning About Artificial Intelligence"; Institutional Investor; Hickox, Fayette; Jul. 1986; p. 209.

"A Home Found for Your Money"; Financial Times; Short; Eric; Feb. 1986.

"Analysis Extension"; Executcom.; 1986.

"Funds Allocation System"; Internation Business Machines Corp.; 1985.

"A Piece of the Roof"; Forbes; Bamford, Janet; pp. 190–194; v132n7; Sep. 26, 1983.

"Credit Cards: Oppurtunities Exist Only for Strivers"; Savings & Loan News; Reich, Kenneth; Nov. 1981; pp. 122–125.

"EFT: Changes That May Shape Its Future"; Bankers Monthly Johnson, H.G. and E C Arnold; Jun. 15, 1979; pp. 14–17.

METHOD FOR MANAGING FINANCIAL ACCOUNTS BY A PREFERRED ALLOCATION OF FUNDS AMONG ACCOUNTS

CROSS-REFERENCE TO RELATED APPLICATION

This is a continuation of application Ser. No. 07/780,590, filed Oct. 23, 1991 which is a continuation-in-part of application Ser. No. 07/686,319, filed Apr. 16, 1991 which is a continuation of application Ser. No. 07/408,173, filed Sep. 15, 1989, now abandoned, which is a continuation of application Ser. No. 38,817, filed Apr. 15, 1987, now U.S. Pat. No. 4,953,085.

BACKGROUND OF THE INVENTION

This relates to a method and apparatus which provides an integrated financial product package. This system is realized, in the preferred embodiment, on a fault tolerant computer system with an operating system capable of real-time on-line transaction processing, and accordingly will be described in such context. It will be understood, however, that the invention may be applied in numerous other contexts, in many variant forms and offer benefits to consumers and producers of financial services other than those specifically referred to herein.

Historically banks and other financial intermediaries have offered consumers only standardized financial service products. This standardization afforded financial institutions reduced data processing and marketing costs, but resulted in financial service products that were often ill-suited for many consumers. For example, mortgage lending against homes has been practiced for many years, but only very recently have several new financial products been introduced in an effort to make mortgage lending more attractive to financial institutions and to make housing more affordable to prospective homeowners. Despite the addition of new mortgage products in this intensely crowded and competitive area, prior practices have not been entirely successful in meeting the goals of either the mortgagor or the financial institutions.

Moreover, product proliferation in the market for financial services has presented the consumer with a confusing array of choices without a convenient or clearly documented means of selecting the best combination of financial services to realize the consumer's financial objectives. Individual purveyors of financial services have often solicited customers and marketed their products on an ad hoc basis. Financial institutions usually possess only limited knowledge of the customer's total financial condition and hence they often try to sell that product that is most advantageous to the financial institution as opposed to what is in the customer's best interest. Moreover, at the present time customers must spend a substantial amount of time coordinating and monitoring their holding of many different financial services from many different suppliers. Few individuals have the time, interest or ability to perform this difficult task well. Additionally, many of the terms of the financial service products have been fixed and inflexible. The products have not afforded consumers the ability to alter their consumption, investment or savings behavior to best suit their own or the economy's changing circumstances.

For example, financial institutions have traditionally lent funds to individuals on a fully secured basis, with an interest rate greater than their own cost of funding the loan. In the last few years however, the financial industry has been deregulated and now it is possible for a variety of financial institutions and firms that market financial services (hereinafter referred to as "financial institutions") to sell an entire range of financial products. Thus, in addition to the traditional objectives of a mortgagee, many financial institutions now view mortgage lending as a vehicle to encourage the borrower to purchase one or more financial service products. Methods are needed, however, to facilitate the provision of one or more financial services in an efficient and comprehensible manner.

From the point of view of the consumer, problems still remain with the relative inflexibility of financial service products. Rapidly changing international, domestic, and personal economic circumstances require that financial service products be flexible so as to allow the consumer the ability to adjust his asset and liability holding and the terms of financial obligations to take best advantage of those changing circumstances. Many financial service products were originally developed at a time when it would have been impossible for a financial intermediary to offer customized, derivative or synthetic financial service products (hereinafter referred to as "derivative products") to individual consumers. With the advent of recent significant advances in information technology it is possible for financial intermediaries to offer derivative financial service products for each individual consumer in accordance with that individual's financial resources, forecast future income and expenses, and attitude toward investment risk.

For example, consider the relative inflexibility of the traditional fixed rate mortgage. (Here, we refer to the term "mortgage"in its most commonly used sense to refer to the entire relationship between the financial institution and the borrower: the loan, the security interest and the contractual obligation to pay the loan. In other contexts, we use the term "mortgage" in its traditional sense to refer to a conditional transfer of real property to secure a loan.) The standard fixed rate thirty year mortgage was developed in part because it provided a standardized financial service product with constant monthly payments that was cost effective for a financial service intermediary to offer its customers. In part, it was structured to accommodate the accounting or data processing department of the bank or thrift institution as opposed to being crafted in the best interest of the consumer. The mortgagor is locked in to an inflexible payment schedule which typically extends over most of the years in which he is working. This is analogous to a shoe store offering only one size and type of shoe. Under this arrangement, the shoe store realizes significant cost efficiencies at the expense of its customer's comfort.

The wide variety of individuals' financial resources and their attitude toward investment risk demand that financial service products be tailored to the current needs of individuals and be sufficiently flexible to accommodate future variations in their requirements. The constantly changing nature of an individual's financial circumstances, the financial markets, and the applicable income and estate tax regulations demand that financial service products be flexible to accommodate constantly changing and often previously unforeseen circumstances.

It is obvious to many consumers of financial services that the products currently offered do not take advantage of deregulation of the financial services industry or recent advances in information and problem solving technologies. Moreover, financial service products do not adequately accommodate either the diversity or the constantly changing nature of individuals' financial preferences or circumstances. Financial service products are not currently employed to offer the consumer a full range of financial services that would help maximize his or her financial return and make housing affordable to a greater number of individuals.

SUMMARY OF THE INVENTION

The present invention is a method and apparatus for effecting at a financial institution an improved personal financial management system incorporating means of implementing, coordinating, supervising, planning, analyzing and reporting upon an array of asset accounts such as investments and liability accounts such as credit facilities. Through a prioritization function, a client specifies his financial objectives, a forecast of economic and financial variables, risk preference and the budgetary constraints to which he is subject. The prioritization function suggests investments and credit facilities to the client to best realize his financial objectives, and may also suggest one or more contractual agreement(s) reflecting a derivative form of financial instrument(s) that may best assist the client in realizing his financial objectives. The suggested prioritization function may recommend various forms of "sweeping" or allocating funds from or to one or more asset or liability accounts. Thus, the present invention provides clients a convenient, cost effective, and rigorous means of improving his or her financial well-being. The prioritization function presents the financial institution an easily definable means of managing client accounts that have potentially an infinite number of investment opportunities in a way that minimizes the detrimental aspects of enforcing compliance while satisfying the financial institution's credit-related objectives.

The personal financial management system includes both standard or derivative forms of asset accounts and liability accounts and may feature credit facilities or loans that are secured by one or more of the asset accounts. Periodic loan payments are not required to be used to pay off the principal of the loan, but may be used according to a prioritized allocation of funds. This prioritized allocation is implemented by the program to maximize the financial well being of the client while satisfying the financial institution's objectives. As will be detailed below, elimination of amortization and more advantageous use of the funds that would be used for amortization may result in substantial improvements in an individual's net worth and have the effect of making better housing affordable to a greater number of individuals.

In preferred embodiments, a central structural element of this financial management system is a type of credit facility or loan that features a variable amortization schedule and is secured by one or more lien(s) on, security interest(s) in, pledge(s), agreement(s) or mortgage(s) of real property and one or more other assets. This loan is called a Home Owner's Managed Equity™ (HOME) Account; and, regardless of the specific legal form it may take, the security element of this loan will be referred to as a lien. Unlike conventional loans which provide for regular amortization payments, the HOME™ Account need not be amortized.

Rather, the system of the present invention gives the borrower client the opportunity to maximize his investment earnings by a variety of means including but not limited to distributing the monies that would normally be used to amortize the loan among assets that give him a greater return. For example, the borrower can receive expert advice and the assistance of decision support systems from the system of the present invention and has the option to use the funds that would otherwise have been used to amortize the loan to make a contribution to a pension or retirement account such as an IRA, KEOGH, S.E.P. or corporate pension plan. The borrower may purchase other investments such as life insurance or annuities in which earnings on premium payments are not taxed under current regulations until they are withdrawn. Alternatively, the borrower can use the funds that might have otherwise been used for amortization payments to decrease the amount outstanding in another liability account or to increase the value of an asset account which is used as collateral for the loan. The system is flexible and is not dependent upon existing laws or regulations. If the applicable regulations are altered, the system of the present invention will assist the client and suggest alternate allocations of funds to or from asset and liability accounts based upon the regulations then in effect or to be in effect in the future. The system of the present invention offers the consumer the benefits of an objective expert advisor at a very low cost that can provide him with an integrated financial plan that is frequently updated. This produces tremendous time savings to the individual consumer, and allows him to escape much of the work currently devoted to coordinating and monitoring his assets and liabilities.

Similarly one or more derivative forms of financial instrument(s) or contractual agreements can be offered by the financial institution to the client that provides investment and or borrowing characteristics that might otherwise be realized through the acquisition or sale of one or more securities, real assets, credit facilities and/or financial instruments. Derivative products may be developed that match the client's desired amounts of gross and net cash flows and levels of balances in various asset and liability accounts over time subject to the client's attitude toward risk and consideration of the level of uncertainty surrounding the value of forecast variables.

One particularly advantageous derivative product enables a present homeowner to enjoy the benefits of the present invention without having to immediately retire an existing mortgage and obtain entirely new refinancing on his home. In this instance, the homeowner continues to make periodic mortgage payments to the original mortgage holder. These payments can be made to the original mortgage holder either directly by the homeowner or through the financial institution that offers the HOME™ Account. In either case, as periodic payments are made to the original mortgage holder, a credit line from the HOME™ Account is debited and an asset account is credited with an amount equal to at least a part of the amortization portion of each periodic payment to the original mortgage holder. As a result, the sum of the principal remaining on the original mortgage and the credit extended through the HOME™ Account may be as much or more than the principal due on the original mortgage at the time the HOME™ Account credit line was first debited. Thus, this HOME™ Account derivative product may effectively reduce, eliminate or reverse the amortization feature of the original mortgage.

In similar fashion, the amount of a client's mortgage can be increased with increases in value in his home and/or in other asset accounts used to secure any loans from his HOME Account. For example, as a client's home increases in value, additional loans may be made to the client so that the loan to value ratio remains constant at 80%. If the client moves and acquires a more expensive house, the HOME™ mortgage may be increased and the new house substituted as collateral for the older less valuable house.

From the financial institution's perspective, in addition to the benefits derived from more effectively managing the marketing of a panoply of financial products, the HOME Account used in the system of the present invention is superior to the other forms of financial service products in that: (1) it offers the lender an additional source of liquid collateral that will, if properly invested, continually appreciate in value, (2) it establishes an account that will assist in the cross selling and marketing of other financial service products that will produce additional fee revenue for the financial institution (3) it offers the lender a superior product to market to its client thus affording it a competitive advantage over other financial institutions and (4) it will result in a longer duration of the credit accounts, increased client loyalty and hence lower marketing costs; (5) it will allow the financial institution the ability to more closely monitor its own and its clients' risk exposures and to take appropriate corrective action; (6) it will allow better pricing margins for the institution because the institution will not be constrained to offering a commodity-like product; and (7) it should rapidly gain wide acceptance in the secondary market in the form of mortgage-backed securities or Real Estate Mortgage Investment Conduit (REMIC) form because of its added security and longer average life.

At the same time, origination, administration and servicing of the HOME Account of the present invention involves many more considerations than a conventional mortgage loan. For example, the home owner's total assets, as adjusted to provide the financial institution with a measure of security for its lending, must always be greater than some imposed minimum standard or minimum borrowing power. Calculation of adjusted total assets requires the financial institution to determine the current value of each asset and multiply it by its current loan to value ratio. In practice, these values must be calculated and checked periodically to correctly reflect changes in the value or quantity of any asset or liability which is part of the system. Thus, for example, if borrowing is made against the cash value of the client's insurance policy or if the value of the client's bond portfolio changes, the asset values may need to be re-calculated, a new borrowing power determined and this new borrowing power compared to the predetermined minimum borrowing power. If the asset value is less than the minimum, the client must modify one or more of his account components e.g. decrease his liabilities or increase the value of an asset account, to bring the total value into the permissible range. A customer information file stored in a relational or object oriented data base management system may be used to facilitate all credit checking activities of the system of the present invention.

The structure and complexity of the system of the present invention suggests that the system would be best implemented on a fault tolerant computer system utilizing a real time on-line transaction processing (OLTP) operating system. As described in its preferred embodiment below, the system provides a real time update of all the components which comprise the account and coordinates, supervises, plans, analyzes and reports upon activities among the various system components.

BRIEF DESCRIPTION OF THE DRAWINGS

These and other objects, features and advantages of the invention will be more readily apparent from the following descriptions of the preferred embodiment of the invention in which.

DETAILED DESCRIPTION OF THE PREFERRED EMBODIMENT

Figure 1:
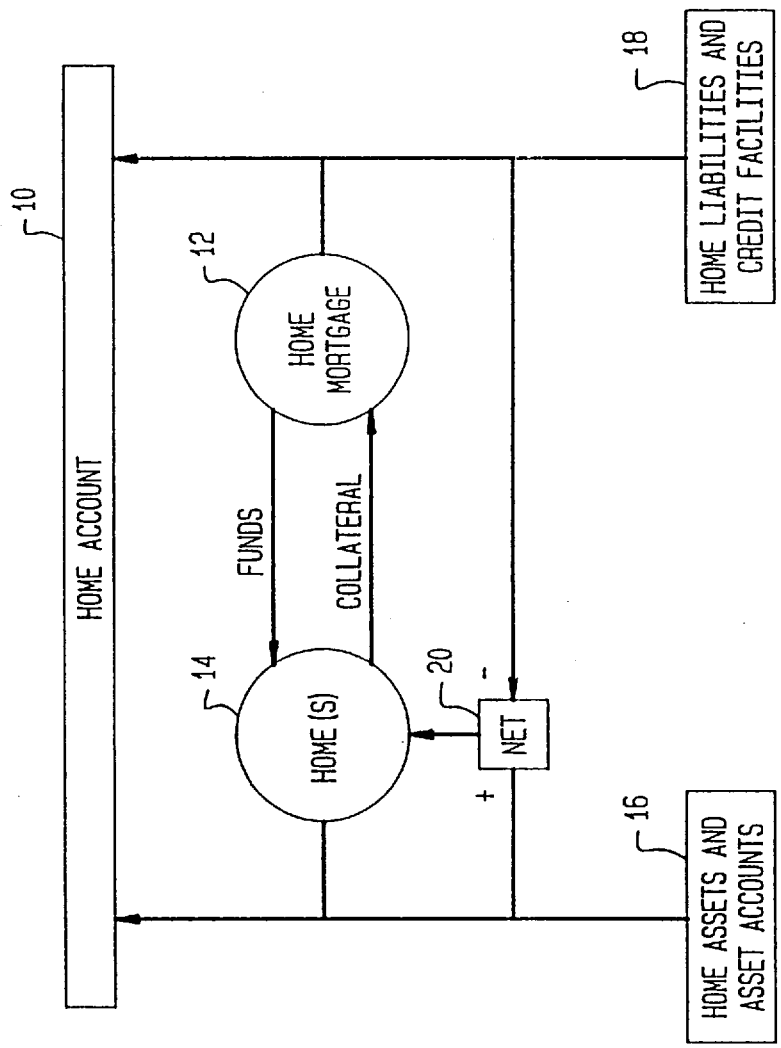
FIG. 1 depicts the basic structure of the financial management system of the present invention.

In this section the basic structure of the preferred embodiment is first described. The economic impact realized by this system is then illustrated through the comparison of the preferred embodiment of the system of the present invention and a conventional mortgage. Information on the HOME Account is presented and the computer system and data structure of the preferred embodiment of the present invention is described. Finally, the different processes that comprise the preferred embodiment of the present invention—the mortgage origination and servicing processes, the transaction order process, calculation of the Home Owner's Managed Equity Borrowing Power (HOMEPW), the Priority Asset and Liability Allocation Process, the Early Warning Process, the HOME Account 25 Compliance Routine and the Emergency Liquidation Procedure—are described.
Introduction FIG. 1 illustrates the basic structure of the preferred embodiment. The financial management system for the Home Owner's Managed Equity (HOME) Account effects an improved personal financial planning and management program incorporating means of implementing, coordinating, supervising, planning, analyzing, and reporting on investments in an array of assets and borrowings from a variety of credit facilities.

The HOME Account 10 is the central operating account through which all transactions are implemented, coordinated, controlled, analyzed and reported to the client. Through the HOME Account the client is provided with client reports updated on a real time basis, portfolio management and financial services, including personal financial planning services.

The core element of the system is a special type of mortgage loan, referred to as a Home Owner's Managed Equity (HOME) Mortgage 12, which is secured by one or more of the client's homes 14 and one or more other asset accounts 16. The system also includes liability accounts such as credit facilities 18.

The client's home(s) 14 is a primary source of collateral for the HOME Mortgage. The system provides the client the opportunity to make increased investments in designated asset accounts 16 instead of decreasing the principal of the mortgage 12. Typically, the designated asset accounts are accounts that are not subject to frequent withdrawal of funds. Thus, these asset accounts may accrue substantial interest and dividend revenue over the term of the mortgage loan and may appreciate in capital value. Alternately, the client can use the amortization payments to decrease a liability account, typically one which has a high interest rate such as a credit card.

The Net Equity Total (NET) 20 is equal to the difference between the sum of all assets 16 and the sum of all liabilities 18, excluding the value of the client's home 14 and mortgage 12. The NET and the home(s) as adjusted by their respective loan to value ratios are available to be used as collateral for the HOME Mortgage 12. By allowing the client to invest monies that would be normally used to amortize a conventional mortgage into other asset accounts the client can increase his investment income and net worth after payment of taxes.

Through the system of the invention the client can optimize or at least, improve the allocation of personal assets and liabilities to maximize his net worth over a period of time by endeavoring to maximize one or more objectives or goals such as the value of the home or homes that can be acquired by an individual given a certain income level, the net after-tax income on investments, or his savings for retirement.

The following example, which compares a conventional mortgage to the mortgage in the system of the present invention, illustrates the economic impact of the system. Assume the following:

(1) both mortgages are for $100,000 for a term of 30 years at a fixed rate of 10% with equal monthly amortization payments;

(2) at the initiation of the mortgage, the client's sole asset is the amount required to make a down payment on his home and the client's sole source of initial income in his salary;

(3) a "pension account", such as a Keogh, SEP or 401(K) plan, and an asset account such as an "insurance policy"both produce returns of 8% per annum compounded. No taxes are payable on the "pension account," the "insurance policy" or earnings thereon until distributions are made. The amount invested each year in the pension account and the insurance policy are equal to, respectively, the amount of the required amortization payment of the conventional mortgage and the tax savings generated by the system of the present invention;

(4) the taxes paid are based upon the taxes payable able for the head of a household filing jointly with three dependents and there are only two tax brackets of 15% and 28% and a 5% tax surcharge for higher income tax payers;

(5) the home is assumed to appreciate at 4% per annum;

(6) the client's net worth is equal to the value of the home, the pension account, and the insurance policy less the amount of the outstanding mortgage;

(7) the client's annual income is initially $50,000 and increases by 5% each year.

TABLE 1

| Year 1 | Conventional Mortgage | System of the Present Invention |
|---|---|---|
| Gross Taxable Income | $50,000 | $50,000 |
| Interest Payments | $9,833 | $10,000 |
| Amortization Payments | $3,334 | $0 |
| Outstanding Loan Balance | $96,666 | $100,000 |
| Pension Account Investment | $0 | $3,334 |
| Pension Account Balance | $0 | $3,467 |
| Net Taxable Income | $40,167 | $36,666 |
| Taxes Paid | $4,375 | $3,850 |
| Net Income After Tax | $35,792 | $32,816 |
| Disposable Income | $32,458 | $36,150 |
| Tax Savings Invested In Insurance | $0 | $500 |
| Insurance Policy Balance | $0 | $521 |
| Market Value of Home | $120,000 | $120,000 |
| Total Disposable Income | $32,458 | $36,150 |
| Net Worth | $23,334 | $23,988 |

Table 1 is illustrative of the client's financial statement for the first year under a conventional mortgage and under the system of the present invention.

In accordance with the present invention, the $3,334 that would otherwise be used annually to amortize the mortgage is instead contributed to a pension account which is not taxed in that year. Thus the client's net taxable income is $36,666 as opposed to the $40,167 when the $3,334 is realized as personal income and used to amortize the mortgage. Correspondingly, the taxes paid are lower and the client's disposable income is greater. In addition, the tax savings of $500 is invested in a tax favored investment such as a single premium whole life insurance policy that yields a balance of $521 at year end.

TABLE 2

| Year 2 | Conventional Mortgage | System of the Present Invention |
|---|---|---|
| Gross Taxable Income | $52,500 | $52,500 |
| Interest Payments | $9,500 | $10,000 |
| Amortization Payments | $3,334 | $0 |
| Outstanding Loan Balance | $93,332 | $100,000 |
| Pension Account Investment | $0 | $3,334 |
| Pension Account Balance | $0 | $7,226 |
| Net Taxable Income | $43,000 | $39,166 |
| Taxes Paid | $5,093 | $4,225 |
| Net Income After Tax | $37,908 | $34,941 |
| Disposable Income | $34,574 | $38,275 |
| Tax Savings Invested In Insurance | $0 | $500 |
| Insurance Policy Balance | $0 | $1,048 |
| Market Value of Home | $124,800 | $124,800 |
| Total Disposable Income | $67,031 | $74,425 |
| Net Worth | $31,468 | $33,111 |

Referring to Table 2, in the second year the client gains the same benefits using the system of the present invention. The client now has an insurance investment balance of $1,048 and a pension account balance of $7,226.

TABLE 3

| Totals After 30 Years | Conventional Mortgage | System of the Present Invention |
|---|---|---|
| Gross Taxable Income | $3,321,942 | $3,321,942 |
| Interest Payments | $149,971 | $300,000 |

TABLE 3-continued

| Totals After 30 Years | Conventional Mortgage | System of the Present Invention |
|---|---|---|
| Amortization Payments | $100,000 | $0 |
| Outstanding Loan Balance | $0 | $100,000 |
| Pension Account Investment | $0 | $100,000 |
| Pension Account Balance | $0 | $417,577 |
| Net Taxable Income | $3,171,971 | $2,921,922 |
| Taxes Paid | $728,798 | $650,563 |
| Net Income After Tax | $2,443,173 | $2,271,359 |
| Disposable Income | $2,343,173 | $2,371,379 |
| Tax Savings Invested In Insurance | $0 | $29,806 |
| Insurance Policy Balance | $0 | $109,023 |
| Market Value of Home | $374,235 | $374,235 |
| Total Disposable Income | $2,343,173 | $2,371,379 |
| Net Worth | $374,238 | $800,835 |

Referring to Table 3, over thirty years the client's total disposable income is $2,371,379 compared to a disposable income of $2,343,173 for a person in like circumstances who is paying off a 30 year conventional mortgage, The principal amount owed on the home is still $200,000. However, the client has accrued a pension account balance of $417,577 and an insurance policy balance of $109,023. The economic impact of the system is clearly realized by comparing the net worth of the client using the system of the present invention and that of a person who purchased a home by taking out a conventional mortgage. Through the system of the present invention the client may more than double his net worth.

The economic advantages of the system are proportionately dramatic for a client initially earning $100,000 a year, increasing 5% annually. Using the same assumptions stated in the example but with a mortgage for $200,000, the $6,667 that would be used annually to amortize the mortgage is placed in a pension account which is not taxed until distributions are made from the account after the client retires. As a result, the client accumulates $785,713 (including interest) in a pension or retirement account. In addition, the client accumulates an insurance policy investment balance of $256,776. As a result, after 30 years of payments the client's total disposable income is $3,588,342, as opposed to a disposable income of $3,405,383 for a person making payments on a 30 year conventional mortgage, and his net worth is $1,599,965, which is more than double the $748,486 net worth of an individual under similar financial conditions after completion of payments on a 30 year conventional mortgage.

The system of the present invention also allows the client to choose among a wide variety of mortgage amortization options. In the example shown below, regular payments made to the account are used to amortize the mortgage until a certain pre-specified, loan-to-value ratio ($ mortgage/ $home value) has been achieved. Having reached the pre-specified loan to value ratio (LTV), the financial institution applies the regular payments hierarchically, first to pay the interest on the mortgage and, second, to invest the remainder of the payment in such investment vehicles as will yield the optimal solution according to an optimization model which takes into account risk/return preference, and personal and general economic and financial projections. Furthermore, the client can choose to decrease a liability account other than the mortgage, typically one which has a relatively high rate of interest, such as a credit card account balance. Other dynamic aspects of the HOME™ Account provide for the maintenance of a constant loan to value ratio as the value of the home increases over time by advancing additional loans such as home equity loans secured by the home and one or more other asset accounts so that the loan to value ratio is always maintained at a constant percentage such as 80%.

An illustrative example which compares the relative financial positions over thirty years for a conventional mortgage user and a HOME Account client is given below.

The example comprises a limited number of accounts and assumes certain initial parameters which are summarized below:

1) All mortgages are for a term of 30 years at a fixed rate of 9% per annum.
2) All mortgages are initially for $160,000.
3) In cases where a constant 80% loan-to-value ratio is maintained for liabilities against the home, all increases in liabilities against the home are shown as additions to the original mortgage. These increases in borrowing would ordinarily take the form of home equity line of credit borrowings with an interest rate equal to or slightly greater than that of the original mortgage. Alternatively, the client may move into a more valuable home periodically and increase the amount of the mortgage and the amount of deductible interest expenses. For simplicity it assumed that the interest rates remain constant.
4) At the initiation of the mortgage, the client's annual earned income is $60,000 growing thereafter at 5% per year.
5) Combined federal and state taxes are paid at the end of each year.
6) The client's net worth is equal to the current value of all assets including the primary residence, less all liabilities.

Table 4 lists the accounts included in this example. Note that these accounts are only intended to illustrate the potential value of the system of the present invention to a consumer. In no way should the list provided here be misconstrued as limiting the number or type of asset or liability accounts that may be used in conjunction with the product.

TABLE 4

ACCOUNTS INCLUDED IN MODEL

Assets:

Checking
Money Market Deposit Account (MMDA)
Certificate of Deposit (CD)
Individual Retirement Account (IRA)
Simplified Employee Pension (SEP)
Annuity
Corporate Bond
Mixed Stock and Bond Fund
Equity in Home
Liabilities:

Mortgage
Home Equity Line of Credit (HELOC)

Table 5 summarizes the initial parameters and investment assumptions for the model.

TABLE 5

MODEL ASSUMPTIONS AND PARAMETERS
INCOME AND TAX

| | |
|---|---|
| Initial Annual Income: | $60,000 |
| Growing at: | 5% per annum |
| Taxed at: | 27% (includes state & federal) |
| Initial Disposable Income: | $20,000 |
| Growing at: | 6% per annum |

HOME AND MORTGAGE

| | |
|---|---|
| Initial Value: | $200,000 |
| Growing at: | 5% per annum |
| of which Equity (initial): | $40,000 |
| of which Mortgage (initial): | $160,000 |
| Term of Mortgage: | 30 years |

INTEREST RATES AND INFLATION

Assets:

| | |
|---|---|
| Checking: | 0.0% |
| MMDA: | 6.0% |
| CD: | 7.0% |
| IRA: | 8.0% |
| SEP: | 8.0 |
| Annuity: | 8.0% |
| Corporate Bond: | 10.5% |
| Mixed Stock and Bond Fund: | 13.0% |

Liabilities:

| | |
|---|---|
| Mortgage: | 9.0% |
| HELOC: | 10.5% |
| Inflation: | 4.0% |

Table 6 and 7 outline the investment behavior for two different types of account holders: conservative and capital growth-oriented.

TABLE 6

CLIENT PROTOTYPE #1 PROFILE
CLIENT PROTOTYPE #1 - CONSERVATIVE INVESTOR

| | |
|---|---|
| Conventional Mortgage: | Investor invests $2,000 per annum in an IRA, additional available funds up; to $50,000 in MMDA, and the remainder in a CD. |
| HOME Account: | Investor holds a home mortgage at a constant 80% loan to value ratio. Amortization payments cease at 80% loan to value ratio and interest only is paid on the loan. The lesser of $30,000 or 15% of earnings is invested in a SEP account, and the remainder is invested in an annuity product. |

TABLE 7

CLIENT PROTOTYPE #2 PROFILE
CLIENT PROTOTYPE #2 - GROWTH-ORIENTED INVESTOR

| | |
|---|---|
| Conventional Mortgage: | Investor invests $2,000 per annum in an IRA, additional available funds up to $50,000 in MMDA, and the remainder in a CD. |
| HOME Account: | Investor holds home mortgage at a constant 80% loan to value ratio. Amortization payments cease at 80% loan to value ratio and interest only is paid on the loan. The lesser of $30,000 or 15% of earnings is invested in a SEP account, and the remainder is invested in an annuity product. |

Table 8 shows the account balances in years 1, 10, 20 and 30 for a conservative investor using a conventional mortgage product, as well as total net worth, retirement savings, taxes paid and disposable income in said years. Table 9 sets forth the mortgage amortization schedule for the conventional mortgage.

In year 30, the nominal value of the borrower's total net worth based upon the use of a conventional mortgage is $1,698,952, with the greatest amounts being held in home equity ($823,228) and the CD account ($492,332). The home is valued at $832,228 and the mortgage has been fully amortized (balance=$0). Total taxes paid in year 30 were $76,385, on earned income of $246,968 and interest income of $48,478. Cumulative taxes paid over 30 years were $1,060,392.

TABLE 8

CLIENT PROTOTYPE #1 - CONSERVATIVE INVESTOR
CONCISE STATEMENT OF FINANCIAL POSITION - CONVENTIONAL PRODUCT

| | YEAR | | | |
|---|---|---|---|---|
| | 1 | 10 | 20 | 30 |
| CURRENT INCOME POSITION | | | | |
| Gross earned income | $60,000 | $93,098 | $151,617 | $246,968 |
| Interest income | $307 | $3,898 | $16,691 | $48,478 |
| Total income | $60,367 | $96,977 | $168,308 | $295,446 |
| Net after tax income | $48,442 | $75,406 | $127,853 | $221,295 |
| Disposable income ex-model | $20,000 | $36,769 | $72,331 | $142,285 |
| OPENING NET WORTH POSITION | $56,000 | $223,237 | $650,640 | $1,598,099 |
| Assets | $219,868 | $394,131 | $814,940 | $1,698,951 |
| Financial Assets | $9,868 | $68,352 | $284,290 | $875,723 |
| Checking account | $5,000 | $5,000 | $5,000 | $5,000 |

TABLE 8-continued

CLIENT PROTOTYPE #1 - CONSERVATIVE INVESTOR

| | | | | |
|---|---|---|---|---|
| MMDA | $2,788 | $33,220 | $79,723 | $142,772 |
| CD | $0 | $0 | $194,382 | $492,332 |
| IRA | $2,080 | $30,132 | $95,185 | $235,629 |
| SEP | $0 | $0 | $0 | $0 |
| Annuity | $0 | $0 | $0 | $0 |
| Corporate bond | $0 | $0 | $0 | $0 |
| Mixed stock & bond fund | $0 | $0 | $0 | $0 |
| Tangible Assets | $210,000 | $325,779 | $530,660 | $823,228 |
| Home value | $210,000 | $325,779 | $530,660 | $823,228 |
| −Liabilities | $158,806 | $141,940 | $99,541 | $0 |
| Credit Card | $0 | $0 | $0 | $0 |
| Personal line of credit | $0 | $0 | $0 | $0 |
| HELOC | $0 | $0 | $0 | $0 |
| Home mortgage | $158,806 | $141,940 | $99,541 | $0 |
| ENDING NET WORTH POSITION | $61,062 | $252,191 | $715,408 | $1,698,951 |
| NET CHANGE IN POSITION | $11,062 | $28,953 | $164,768 | $100,854 |

SUMMARY INFORMATION

| | YEAR | | | | | |
|---|---|---|---|---|---|---|
| | 1 | 10 | 20 | 30 | CUM | NPV |
| Net after-tax income | $48,442 | $75,406 | $128,717 | $227,340 | $3,408,502 | $1,092,941 |
| Taxes paid | $11,865 | $21,572 | $46,774 | $76,385 | $1,060,392 | $355,998 |
| Networth | $61,062 | $252,191 | $715,408 | $1,698,952 | | $520,945 |
| Retirement savings | $4,868 | $63,352 | $273,359 | $796,416 | | $255,372 |

TABLE 9

MORTGAGE AMORTIZATION SCHEDULE - CONVENTIONAL MORTGAGE

| YEAR END | TOTAL PAYMENT | INTEREST | PRINCIPAL | MORTGAGE BALANCE | HOME VALUE |
|---|---|---|---|---|---|
| 0 | | | | $160,000 | $200,000 |
| 1 | $15,449 | $14,255 | $1,193 | $158,806 | $210,000 |
| 2 | $15,449 | $14,149 | $1,300 | $157,506 | $220,500 |
| 3 | $15,449 | $14,033 | $1,416 | $156,090 | $231,525 |
| 4 | $15,449 | $13,907 | $1,542 | $154,548 | $243,101 |
| 5 | $15,449 | $13,769 | $1,679 | $152,868 | $255,256 |
| 6 | $15,449 | $13,620 | $1,829 | $151,039 | $268,019 |
| 7 | $15,449 | $13,457 | $1,992 | $149,047 | $281,420 |
| 8 | $15,449 | $13,279 | $2,169 | $146,877 | $295,491 |
| 9 | $15,449 | $13,086 | $2,363 | $144,514 | $310,266 |
| 10 | $15,449 | $12,875 | $2,573 | $141,940 | $325,779 |
| 11 | $15,449 | $12,646 | $2,802 | $139,138 | $342,068 |
| 12 | $15,449 | $12,396 | $3,052 | $136,085 | $359,171 |
| 13 | $15,449 | $12,124 | $3,324 | $132,761 | $377,130 |
| 14 | $15,449 | $11,828 | $3,620 | $129,140 | $395,986 |
| 15 | $15,449 | $11,506 | $3,943 | $125,197 | $415,786 |
| 16 | $15,449 | $11,154 | $4,294 | $120,902 | $436,575 |
| 17 | $15,449 | $10,772 | $4,677 | $116,225 | $458,404 |
| 18 | $15,449 | $10,355 | $5,093 | $111,131 | $481,324 |
| 19 | $15,449 | $9,901 | $5,547 | $105,583 | $505,390 |
| 20 | $15,449 | $9,407 | $6,041 | $99,541 | $530,660 |
| 21 | $15,449 | $8,868 | $6,586 | $92,961 | $557,193 |
| 22 | $15,449 | $8,282 | $7,166 | $85,795 | $585,052 |
| 23 | $15,449 | $7,644 | $7,805 | $77,989 | $614,305 |
| 24 | $15,449 | $6,948 | $8,500 | $69,489 | $645,020 |
| 25 | $15,449 | $6,191 | $9,257 | $60,231 | $677,271 |
| 26 | $15,449 | $5,366 | $10,082 | $50,149 | $711,135 |
| 27 | $15,449 | $4,468 | $10,980 | $39,168 | $746,691 |
| 28 | $15,449 | $3,490 | $11,959 | $27,209 | $784,026 |
| 29 | $15,449 | $2,424 | $13,024 | $14,184 | $823,227 |
| 30 | $15,449 | $1,264 | $14,185 | $0 | |

Table 10 outlines the same account balances for a conservative investor who uses the HOME™ Account instead of a conventional mortgage. Table 11 set forth the mortgage amortization schedule for a HOME Account Mortgage in the same amount. In year 30, the nominal value of this prototypical borrower's total net worth is $5,903,922, with the greatest amounts being held in the SEP ($1,687,772) and annuity ($3,750,065) accounts. The home is valued at $823,228, with a mortgage of $658,582, which is 80% of the total value of the home. No amortization payments are made. Total taxes paid in year 30 were $42,976, on earned income of $246,968 and interest income of $410,610. Cumulative taxes paid over 30 years were $651,616.

The use of the HOME Account has increased the nominal value of this same prototypical consumer's net worth by a total of $4,204,970 over a thirty year time period in comparison to the results using a conventional mortgage.

TABLE 10

CLIENT PROTOTYPE #1 - CONSERVATIVE INVESTOR

CONCISE STATEMENT OF FINANCIAL POSITION - HOME ™ ACCOUNT

| | YEAR | | | |
|---|---|---|---|---|
| | 1 | 10 | 20 | 30 |
| CURRENT INCOME POSITION | | | | |
| Gross earned income | $60,090 | $93,080 | $151,617 | $246,968 |
| Interest income | $349 | $16,804 | $93,944 | $410,610 |
| Total income | $60,349 | $109,884 | $245,561 | $657,578 |
| Net after tax income | $48,472 | $94,650 | $222,607 | $614,602 |
| Disposable income ex-model | $20,000 | $36,769 | $72,331 | $142,285 |
| OPENING NET WORTH POSITION | $50,000 | $277,965 | $1,259,187 | $5,171,147 |
| Assets | $221,304 | $574,699 | $1,858,465 | $6,562,504 |
| Financial Assets | $11,304 | $248,920 | $1,327,807 | $5,739,276 |
| Checking account | $5,000 | $5,000 | $5,000 | $5,000 |
| MMDA | $4,224 | $13,054 | $30,166 | $60,810 |
| CD | $0 | $0 | $0 | $0 |
| IRA | $2,080 | $30,132 | $95,185 | $235,629 |
| SEP | $0 | $125,259 | $572,411 | $1,687,772 |
| Annuity | $0 | $75,475 | $625,045 | $3,750,065 |
| Corporate bond | $0 | $0 | $0 | $0 |
| Mixed stock & bond fund | $0 | $0 | $0 | $0 |
| Tangible Assets | $210,000 | $325,779 | $530,660 | $823,227 |
| Home value | $210,000 | $325,779 | $530,660 | $823,227 |
| −Liabilities | $160,000 | $248,213 | $404,312 | $658,582 |
| Credit Card | $0 | $0 | $0 | $0 |
| Personal line of credit | $0 | $0 | $0 | $0 |
| HELOC | $0 | $0 | $0 | $0 |
| Home mortgage | $160,000 | $248,213 | $404,312 | $658,582 |
| ENDING NET WORTH POSITION | $61,304 | $326,487 | $1,454,153 | $5,903,992 |
| NET CHANGE IN POSITION | $11,304 | $48,581 | $194,966 | $732,775 |

SUMMARY INFORMATION

| | YEAR | | | | | |
|---|---|---|---|---|---|---|
| | 1 | 10 | 20 | 30 | CUM | NPV |
| Net after-tax income | $48,472 | $94,650 | $222,607 | $614,602 | $6,233,359 | $1,998,735 |
| Taxes paid | $11,876 | $15,234 | $22,954 | $42,976 | $651,616 | $208,942 |
| Net worth | $61,304 | $326,487 | $1,454,153 | $5,903,922 | | $1,893,101 |
| Retirement savings | $6,304 | | | | | |

TABLE 11

MORTGAGE AMORTIZATION SCHEDULE - HOME ™ MORTGAGE

| YEAR END | TOTAL PAYMENT | INTEREST | PRINCIPAL | MORTGAGE BALANCE | HOME VALUE |
|---|---|---|---|---|---|
| 0 | | | | $160,000 | $200,000 |
| 1 | $14,255 | $14,255 | $0 | $168,000 | $210,000 |
| 2 | $14,975 | $14,975 | $0 | $176,400 | $220,500 |
| 3 | $15,731 | $15,731 | $0 | $185,220 | $231,525 |
| 4 | $16,525 | $16,525 | $0 | $194,481 | $243,101 |
| 5 | $17,358 | $17,358 | $0 | $204,205 | $255,256 |
| 6 | $18,233 | $18,233 | $0 | $214,415 | $268,019 |
| 7 | $19,142 | $19,142 | $0 | $255,136 | $281,420 |
| 8 | $20,117 | $20,117 | $0 | $236,393 | $295,491 |
| 9 | $21,130 | $21,130 | $0 | $248,213 | $310,266 |
| 10 | $22,194 | $22,194 | $0 | $260,623 | $325,779 |
| 11 | $23,311 | $23,311 | $0 | $273,654 | $342,068 |
| 12 | $24,484 | $24,484 | $0 | $287,337 | $359,171 |
| 13 | $25,715 | $25,715 | $0 | $301,704 | $377,130 |
| 14 | $27,008 | $27,008 | $0 | $316,789 | $395,986 |
| 15 | $28,366 | $28,366 | $0 | $332,629 | $415,786 |
| 16 | $29,791 | $29,791 | $0 | $349,260 | $436,575 |
| 17 | $31,288 | $31,288 | $0 | $366,723 | $458,404 |
| 18 | $32,860 | $32,860 | $0 | $385,059 | $481,324 |
| 19 | $34,510 | $34,510 | $0 | $404,312 | $505,390 |
| 20 | $36,243 | $36,243 | $0 | $424,528 | $530,660 |
| 21 | $38,062 | $38,062 | $0 | $445,754 | $557,193 |
| 22 | $29,973 | $29,973 | $0 | $468,042 | $585,052 |
| 23 | $41,979 | $41,979 | $0 | $491,444 | $614,305 |
| 24 | $44,085 | $44,085 | $0 | $516,016 | $645,020 |
| 25 | $46,296 | $46,296 | $0 | $541,817 | $677,271 |
| 26 | $48,618 | $48,618 | $0 | $568,908 | $711,135 |
| 27 | $51,057 | $51,057 | $0 | $597,353 | $746,691 |
| 28 | $53,617 | $53,617 | $0 | $627,221 | $784,026 |
| 29 | $56,305 | $56,305 | $0 | $658,582 | $823,227 |
| 30 | $59,127 | $59,127 | $0 | | |

As shown in Table 12, the conventional mortgage results for the prototypical, capital growth-oriented borrower are the same as for the conservative borrower. However, for the growth-oriented borrower the benefits of using the HOPE Account are more dramatic. As shown in Table 13, total net worth in year 30 is $11,227,294.

TABLE 12

CLIENT PROTOTYPE #2 - GROWTH-ORIENTED INVESTOR

CONCISE STATEMENT OF FINANCIAL POSITION - CONVENTIONAL PRODUCT

| | YEAR | | | |
|---|---|---|---|---|
| | 1 | 10 | 20 | 30 |
| CURRENT INCOME POSITION | | | | |
| Gross earned income | $60,000 | $93,998 | $151,617 | $246,968 |
| Interest income | $307 | $3,898 | $16,691 | $48,478 |
| Total income | $60,307 | $96,977 | $168,308 | $295,446 |
| Net after tax income | $48,442 | $75,406 | $127,853 | $221,295 |
| Disposable income ex-model | $20,000 | $36,769 | $72,331 | $142,285 |
| OPENING NET WORTH POSITION | $50,000 | $223,237 | $650 640 | $1,598,099 |
| Assets | $219,868 | $394,131 | $814,949 | $1,698,951 |
| Financial Assets | $9,868 | $68,352 | $284,290 | $875,723 |
| Checking account | $5,000 | $5,000 | $5,000 | $5,000 |
| MMDA | $2,7888 | $33,220 | $79,723 | $142,772 |
| CD | $0 | $0 | $104,382 | $492,332 |
| IRA | $2,080 | $30,132 | $95,185 | $235,829 |
| SEP | $0 | $0 | $0 | $0 |
| Annuity | $0 | $0 | $0 | $0 |
| Corporate bond | $0 | $0 | $0 | $0 |
| Mixed stock & bond fund | $0 | $0 | $0 | $0 |
| Tangible Assets | $210,000 | $325,779 | $530,660 | $823,228 |
| Home value | $210,009 | $325,779 | $530,660 | $823,228 |
| -Liabilities | $158,806 | $141,940 | $99,541 | $0 |
| Credit Card | $0 | $0 | $0 | $0 |
| Personal line of credit | $0 | $0 | $0 | $0 |
| HELOC | $0 | $0 | $0 | $0 |
| Home mortgage | $158,806 | $141,949 | $99,541 | $0 |
| ENDING NET WORTH PDSITION | $61,062 | $252,191 | $715,408 | $1,698,951 |
| NET CHANGE IN POSITION | $11,062 | $28,953 | $164,768 | $100,854 |

SUMMARY

| | YEAR | | | | | |
|---|---|---|---|---|---|---|
| | 1 | 10 | 20 | 30 | CUM | NPV |
| Net after-tax income | $48,442 | $75,406 | $128,717 | $227,340 | $3,408,502 | $1,092,941 |
| Taxes paid | $11,865 | $21,572 | $40,774 | $76,385 | $1,060,392 | $355,998 |
| Networth | $61,062 | $252,191 | $715,408 | $1,698,952 | | $520,945 |
| Retirement savings | $4,868 | $63,352 | $273,359 | $796,516 | | $255,372 |

TABLE 13

CLIENT PROTOTYPE #2 - GROWTH-ORIENTED INVESTOR

CONCISE STATEMENT OF FINANCIAL POSITION - HOME ACCOUNT

| | YEAR | | | |
|---|---|---|---|---|
| | 1 | 10 | 20 | 30 |
| CURRENT INCOME POSITION | | | | |
| Gross earned income | $60,000 | $93,080 | $151,617 | $246,968 |
| Interest income | $349 | $21,725 | $167,601 | $1,147,025 |
| Total income | $60,349 | $114,805 | $319,218 | $1,393,993 |
| Net after tax income | $48,472 | $96,935 | $246,907 | $1,081,395 |
| Disposable income ex-model | $20,000 | $36,769 | $72,331 | $142,285 |
| OPENING NET WORTH POSITION | $50,000 | $290,521 | $1,604,576 | $9,386,725 |
| Assets | $221,304 | $593,813 | $2,310,764 | $11,885,876 |
| Financial Assets | $11,304 | $268,034 | $1,780,105 | $11,062,648 |
| Checking account | $5,000 | $5,000 | $5,000 | $5,000 |
| MMDA | $4,224 | $13,054 | $30,166 | $60,810 |
| CD | $0 | $0 | $0 | $0 |
| IRA | $2,080 | $30,132 | $95,185 | $235,629 |
| SEP | $0 | $125,986 | $591,746 | $1,729,515 |
| Annuity | $0 | $0 | $0 | $0 |
| Corporate bond | $0 | $0 | $0 | $0 |
| Mixed stock & bond fund | $0 | $93,862 | $1,058,008 | $9,031,694 |
| Tangible Assets | $210,000 | $325,779 | $530,660 | $823,227 |

TABLE 13-continued

CLIENT PROTOTYPE #2 - GROWTH-ORIENTED INVESTOR

| | | | | |
|---|---:|---:|---:|---:|
| Home value | $210,000 | $325,779 | $530,660 | $823,227 |
| −Liabilities | $160,000 | $248,213 | $404,312 | $658,582 |
| Credit Card | $0 | $0 | $0 | $0 |
| Personal line of credit | $0 | $0 | $0 | $0 |
| HELOC | $0 | $0 | $0 | $0 |
| Home mortgage | $160,000 | $248,213 | $404,312 | $658,582 |
| ENDING NET WORTH POSITION | $61,304 | $345,601 | $1,906,452 | $11,227,294 |
| NET CHANGE IN POSITION | $11,304 | $55,080 | $301,876 | $1,840,569 |

SUMMARY INFORMATION

| | YEAR | | | | | |
|---|---:|---:|---:|---:|---:|---:|
| | 1 | 10 | 20 | 30 | CUM | NPV |
| Net after-tax income | $48,472 | $96,935 | $264,907 | $1,081,395 | $8,434,793 | $2,704,628 |
| Taxes paid | $11,876 | $17,870 | $54,311 | $312,598 | $2,038,913 | $653,780 |
| Net worth | $61,304 | $345,601 | $1,906,452 | $11,227,294 | | $3,600,048 |
| Retirement savings | $6,304 | $263,035 | $1,775,104 | $11,057,649 | | $3,545,651 |

While the examples given here are for individuals earning $60,000 per annum in year 1, the benefits of using the HOPE Account instead of a conventional mortgage are equally dramatic for other income levels. To implement such a system capable of producing these useful improvements in the planning and management of personal financial assets and credit facilities requires considerable change in the present methods for originating, administering, and servicing financial accounts. The present invention details techniques for accomplishing these changes to provide consumers the ability to improve the returns from the management of their personal financial resources while also providing appropriate security for the financial institution.

The HOME Account

Table 14 illustrates the type of asset accounts that a client may have within the system some of which may be collateralized to form additional security for the HOME mortgage. Funds that might ordinarily be used to amortize a conventional mortgage may be invested in these asset accounts pursuant to the terms of the HOME Account. The asset accounts include insurance and annuities (I), pension and deferred compensation accounts (II), banking accounts (III), mutual funds (IV), brokerage accounts (V) and other asset accounts (VI). Specific forms of each of these types of assets are enumerated in Table 14.

TABLE 14

HOME ASSET ACCOUNTS

| I<br>Insurance<br>and<br>Annuities | II<br>Pension and<br>Deferred<br>Compensation | III<br>Banking<br>Accounts | IV<br>Mutual<br>Funds | V<br>Brokerage<br>Accounts | VI<br>Other<br>Assets |
|---|---|---|---|---|---|
| Life | IRA | Checking | Money Market | Stock | Trusts |
| Health | 401(K) | Savings | Equity | Bonds and Fixed Income | Other real Property |
| Accident/Casuaity | SEP | NOW Account | Fixed Income | Options | Art and Antiques |
| Annuities | Keogh | Money Market | International | Commodity Futures | Private Equity Holdings |
| Other | ESOP | Other | Options | Other | Derivative Securities |
| | Other | | Other | | Other |

Table 15 lists several types of liabilities and credit facilities available through the HOME Account which include, but are not limited to, margin account borrowing, (I), credit and debit cards (II), equity access loans and credit facilities (III), insurance and annuity policy loans (IV), as well as other forms of liabilities and credit facilities (V). Specific forms of these. liabilities and credit facilities are also set forth in Table 15.

TABLE 15

HOME LIABILITIES AND CREDIT FACILITIES

| I<br>Margin Account Borrowing | II<br>Credit and Debit Cards | III<br>Equity Access Loans and Credit Facilities | IV<br>Insurance and Annuity Policy Loans | V<br>Other |
|---|---|---|---|---|
| Against Equity Securities | Visa ™ | Equity Access Loans and Home Equity Line of Credit | Insurance and Annuity Policy Facilities Loans | Student Loans<br><br>Automobile Loans |
| Against Vacation Fixed Income Securities | MasterCard ™ | Second Mortgage | Against Insurance Policies | Loans |
| N.A.V. of Options Account | Diners Club ™ | HOME Loan secured by NET | Against Annuities | Pre-Existing Debt |
| Other | American Express ™ | HOME Loan Secured by Account or Other Assets | Other | Home Acquisition Loan |
| | Discover ™ | Other Mortgage Loans | | Home Rehabilitation Loan |
| | Automatic Teller Machine (ATM) card | Other | | Cash Advance<br><br>Derivative Liabilities |
| | Other | | | Other |

The HOME Account provides the client the flexibility to maximize his financial performance and realize his financial objectives. Through the system of the invention, financial services and products can be automatically received and dispensed within the HOME Account framework. For example, withdrawals, deposits and transfers may be made; securities, commodities and debt instruments may be purchased, sold and transferred in and out of the account; financial agreements such as insurance and annuity contracts and policies may be purchased or sold within the framework of the HOME Account; the agreements, contracts and policies purchased may be transferred to safekeeping accounts monitored within the HOME Account; a wide variety of different types of credit facilities and loans may be advanced to clients of the HOME Account; and proceeds from credit facilities and loans received outside the framework of the HOME Account may be transferred to the account for use in the acquisition of other assets.

Further, the HOME Account provides a priority allocation feature which allocates funds from mortgage payments and additional cash flow such as funds from earned income and interest and dividend revenue on the asset accounts and capital appreciation. The funds are generally placed in an asset recommended by the system of the present invention and designated by the client (e.g. an account having the highest interest rate or potential for capital appreciation). Alternatively, the funds can be utilized to pay off a liability account designated by the client (e.g., an account charging the highest interest rate). Thus, the allocation feature provides the client with an additional revenue earning feature that maximizes interest earnings and capital appreciation and/or minimizes interest charges.

The system of the present invention can provide the client a periodic account activity report that clearly displays the details with regard to each transaction conducted within the account during a relevant time period such as a purchase and sale of securities, withdrawals or deposit of cash, acquisition of annuities and insurance policies, and access to one or more types of credit facilities. The client's earnings can be categorized and summarized according to such categories as interest, dividends, asset disposition, or wages. Every transaction executed on a debit or credit card, through an ATM, a telephone or fax system, interpreted by a voice recognition system or by a client's automated interactive computer system can be entered in the HOME Account monthly statement so that an accurate on-going list of expenses and the type of expenses can be presented automatically to the client at the end of every month and a detailed summary can be presented at year end for assistance in preparing personal tax returns. Through the use of smart cards or credit or debit cards containing data concerning his personal information and financial and credit history, a client can, for example, establish and receive the full benefits of using a HOME Account at an ATM or over the phone. Moreover the cards used by the HOME Account clients may be programmed to pay for charges on the card by incurring secured indebtedness against one or more of the asset accounts.

The system of the invention also provides a client with a variety of standard accounting information which has commonly been used in a business environment but has seldom been appropriately applied to personal financial reporting. For example, the system may provide a client with sources and uses of funds statements, personal balance sheets indicating the market value of assets and liabilities in each category and illustrating the client's net worth, a profit and loss report indicating net income for the period and year to date and an income and expense report comparing actual results to budgeted amounts. Data visualization methods and multimedia computer hardware and software may be used to demonstrate the effects upon an individual client's financial status of an anticipated or an executed transaction.

Through the system of the invention, the client can also access a host of ancillary investment news, information, advice, and counseling. In particular, a client can access a current news and information data base such as Reuters, Telekurs, Telerate, Dow Jones News Retrieval™, The Source™ and Compuserve™ or other news and data services. For information retrieval the data base can be accessed directly by the client in a manner consistent with the appropriate security procedures or it can be accessed by structured query language (SQL) calls or by means of an expert system that interprets text to retrieve news and other data that are of particular interest to the client.

Clients of the HOME Account can also receive personal financial planning and analysis assistance by means of an interactive expert computer system and direct consultation with financial planners. In the preferred embodiment of the invention an expert system provides integrated financial advice to the client consistent with achieving the client's specific investment objectives subject to budgetary and risk-related constraints. Recent advances in rule, case, fuzzy logic and model based expert systems together with advances in such pattern recognition technologies as neural networks, classifier systems incorporating genetic learning techniques and abductive reasoning tools offer financial institutions the ability to provide their clients with intelligent financial advice at a reduced cost and an enhanced level of reliability over reliance upon account managers. Knowledge based systems offer a convenient and cost effective means of providing integrated planning and analysis services to clients that are consistent with and utilize techniques derived from modern portfolio theory, capital asset pricing models, and operations research methodologies to help the customer realize his financial objectives. In cases where multiple problem solving techniques are required to best realize a client's objectives, a blackboard or other type of expert system is used to properly apply each problem solving technique to the appropriate aspect of the problem and incorporate a form of machine learning. Both stochastic and fuzzy techniques for dynamic multiobjective decision making under uncertainty provide portfolio optimization tools that explicitly integrate considerations of risk and uncertainty in the planning process. Moreover, expert systems incorporating these problem solving methodologies offer full interactive explanatory capabilities so that clients can not only understand the advice given but also the rationate and the reasoning that generated the advice.

Through the system of the prevent invention, the client may also receive accounting and tax preparation assistance through an interactive computer system with on-line expert computer software assistance with the opportunity to utilize certified public accountants. The client may also receive tax, estate and legal counseling advice through an interactive expert system that has full access to data bases offering information retrieval from data providers such as LEXIS™ including all applicable tax code rules and regulations, ERISA regulations and applicable case law, etc.

The HOME Account Computer System and Data Structure

Depending upon the number of HOME Accounts and the complexity and size of each account, the system may be implemented on a microcomputer, minicomputer, workstation, file server, compute server, data base management system server, mainframe computer, super computer, massively parallel processing computer or any system offering a combination of one or more of these computers. In the preferred embodiment of the invention, the financial institution or a data processing firm providing computing services to the financial institution, would maintain a computer system that integrated a variety of different types of computer hardware into an open network computing environment.

In this type of massively distributed architecture with multiple processors, a single task may employ many resources-data, processors, and memory-transparently throughout the system. All aspects of the parallel distributed processing system may communicate with one another in a variety of forms (i.e. voice, data, multimedia etc.). Key hardware components of the system are fault-tolerant. The operating system provides for real-time on-line transaction processing and offers a secure environment for multiple users conducting multitasking. Users may utilize multiple processors in such a distributed computing environment. Compute intensive activities such as use of expert systems, optimization, imaging and multimedia applications may be performed by separate processors or compute servers.

All aspects, of the system including hardware and software applications, may transparently communicate and share information with each other. In this way financial institutions may provide convenient access to a full range of financial and information services to customers and the financial institutions' personnel. Computerized voice recognition techniques allow customers and the personnel of the financial institution to enter transaction orders into the system and to have their identity confirmed for security purposes. The system advantageously incorporates recent advances in object oriented design in its operating system, communication protocols, and software design.

Examples of such system components include workstations by AT&T, NCR, SUN (Sparc Station 2), NeXT, IBM (RS6000) and others. These same companies produce file servers of various processing capacities. Parallel processing DBMS servers from Teradata and open system parallel processing servers from NCR such as the System 3600 offer scalable parallel processing system capacity for expert system support and OLTP. Top End from NCR and Tuxedo/T from AT&T are illustrative transaction processing monitors that may be incorporated into the system.

Figure 2:
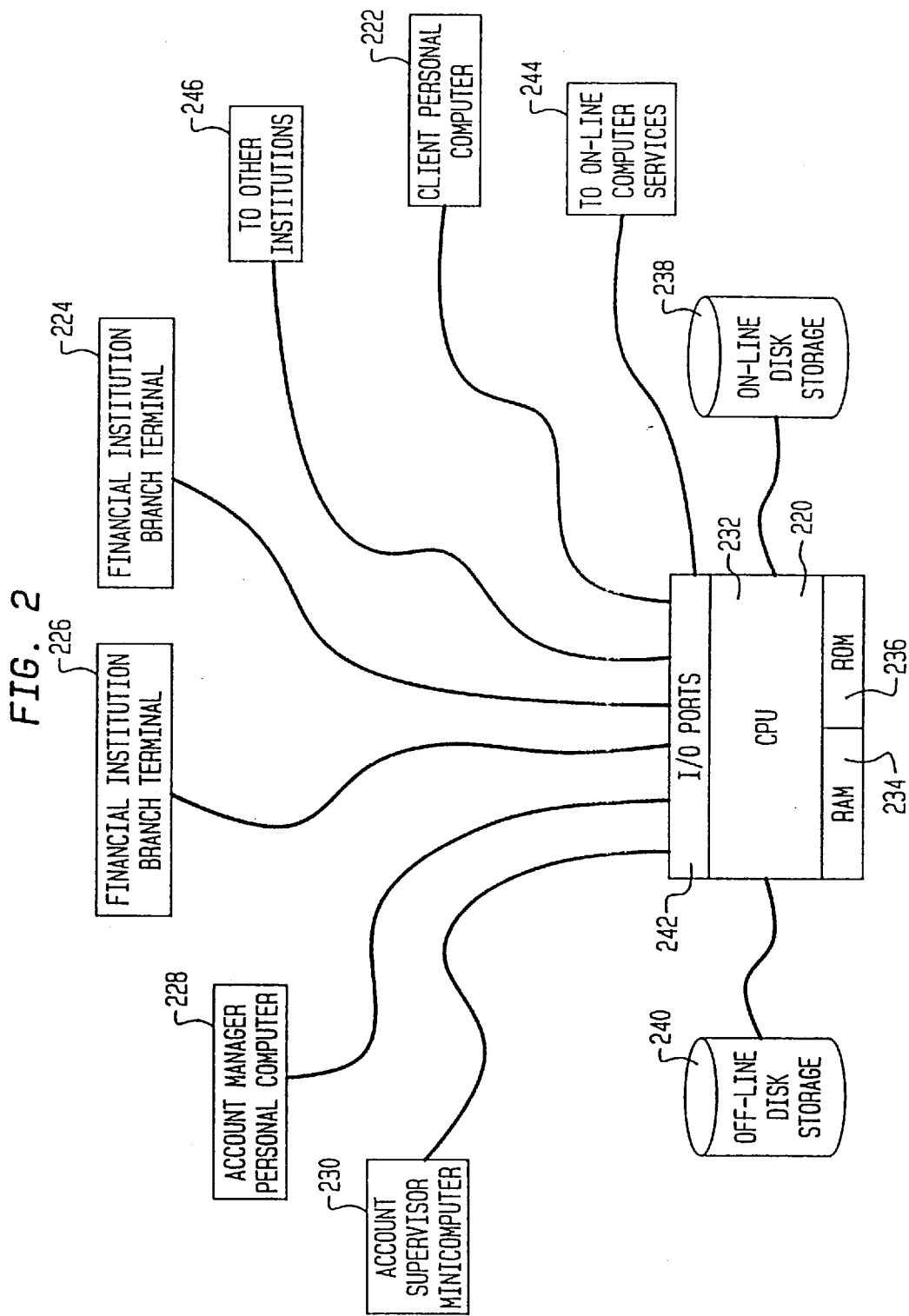
FIG. 2 illustrates the basic structure of the computer system to be used for the method and system of the present invention.

Referring to FIG. 2, the HOME Account system illustratively comprises a central computer 220, which may be a server, a minicomputer or mainframe connected to a plurality of terminal workstations, personal computers (PC) or minicomputers 222, 224, 226, 228, 230. The central computer 200 stores the HOME Account information as well as processes and updates the HOME Account components. The personal workstations, computers or low-end minicomputers may be located at branch offices 224, 226 of the financial institution, at the desk of the HOME Account manager 228, HOME Account supervisor 230 and at the home of the client 222. These computers may act as a terminal to the central computer or any one of the servers and can communicate with and share data and applications with all other aspects of the system so as to record and store reports issued by the system during processing and may perform local processing of information particular to the user of the personal computer workstation. For example, the HOME Account manager may have a workstation PC at his desk through which the manager can communicate with all other aspects of the system, receive client reports from the central computer and perform types of personal financial planning and analysis on the HOME Account that need not typically be performed on the central computer.

The computer system 220 comprises a Central Processing Unit (CPU) 232, Random Access Memory (RAM) 234, Read Only Memory (ROM) 236, on-line 238 and off-line 240 storage and communication and input/output (I/O) ports 242.

The I/O ports 242 provide the means for communications with the client, networks and other financial systems and services 242. For example, the system may connect to a network to access news or financial information such as stock prices, or communicate with a brokerage firm for the processing of a transaction. The client, through a terminal at the financial institution's office 224, 226, through a personal computer with a modem located in the client's home 222, or through an intelligent telecommunication device may communicate with the system to inquire about the status of his account, check news or financial information, or initiate a transaction.

Other banks, financial service institutions and insurance companies 246 may communicate with the HOME Account's system in order to transfer asset and liability holdings or verify asset or liability holdings.

The client account information is stored in a database on the distributed multiprocessing computer system. The system is not limited in the types of databases that can be utilized although relational databases such as those offered by Synbase, Informix, Oracle, IBM (DB2), and Focus and object oriented data base management systems (OODBMS) may be implemented. Access to the databases may be made through direct SQL calls or through remote procedure calls or stored procedure calls.

Figure 3:
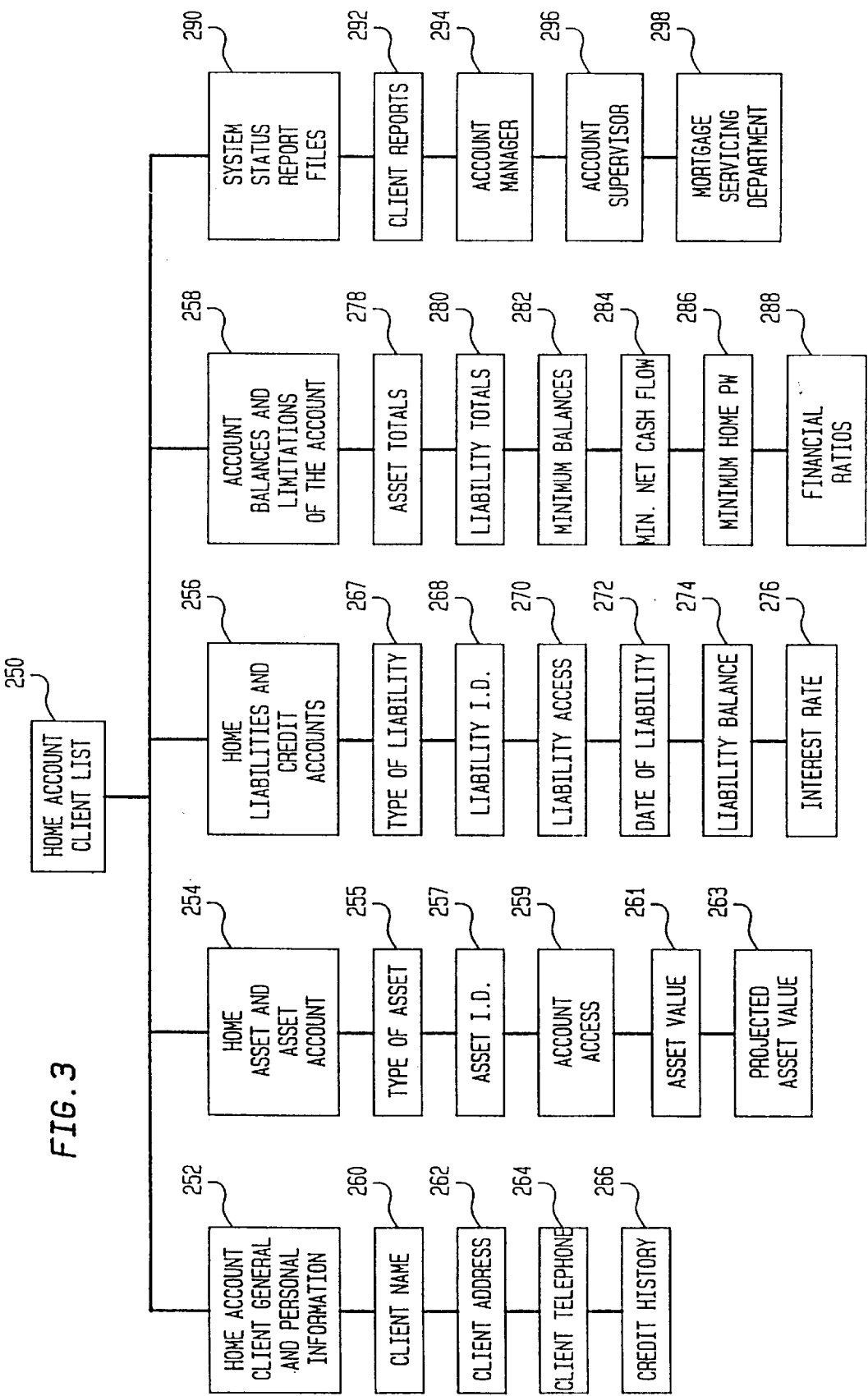
FIG. 3 illustrates the basic data structure of the present invention.

Referring to FIG. 3, the client data illustratively are organized in the database into four areas or files indexed according to HOME Account client numbers 250: general and personal information of the client 252, HOME asset information 254, HOME liability and credit account information 256, HOME account balances, account limitations and constraints 258.

The HOME Account general and personal information file 252 which is usually referred to as a customer information file contains personal and financial information on each client such as name 260, home and work address 262, home and work telephone number 264 and past credit history 266. The HOME Account asset information file 254 contains all the data regarding each client asset and asset account which is part of the HOME Account. Each asset is described according to a variety of data including the type of asset 255, asset identifying information 257 (e.g. policy numbers, bank and bank account number), how it can be accessed 259 (e.g. bank or financial institution routing and transit numbers), the current value of the asset 261 and projected future value of the asset 263.

The HOME Account liability and credit account file contains the type of information similar to the account asset file including the type of liability 267, identifying information on the liability 268, liability access 270, date of origination of the liability 272, the liability balance 274 and the interest rate 276 on the liability.

The HOME Account balance and account limitations files 258 contains HOME balance information such as asset totals 278, liability totals 280 and account limitations such as minimum imposed balances 282, minimum imposed net cash flow 284, the imposed minimum HOME borrowing power (MIM) 286 and financial ratios 288.

The HOME Account can perform periodic screenings of what may be referred to as the customer information file or the client data files for the purpose of accessing client related information or marketing additional financial products to the existing clients. The account automatically reviews the client databases for specific client information including the client's assets, liabilities, credit history, cash flow, age, etc. The account then matches the client's particular personal and financial situation to either new financial products being offered or financial products that the client is not presently using which would improve the client's financial well-being. If a match is found, the client is notified of his eligibility to utilize the financial product(s) and apprised of the potential benefits and advised of any risks associated with the product (s). In this way, the client receives direct benefits from the financial product; and the financial institution offering the product receives additional revenue from fees on the products and increased liquidity from a relatively low cost marketing effort.

The HOME Account also performs screenings of the client's account files to detect any irregularities in account transactions which might be an indication of fraudulent tampering with the account by an outside source. For example, if there is a significant increase in the number of charges placed on a credit card in a short time period, or if multiple transactions are originating from a region other than the client's home region, the account's screening process will automatically detect the irregularities, alert the account manager and then alert the client. The screening process is accomplished in various ways. For example, it may be performed by reviewing all recent transactions within a prespecified amount of time, and comparing these transactions with past account transactions to detect any irregularities in the client's transaction patterns. This screening process can be performed continuously, prior to and/or immediately after transactions or in predetermined periodic intervals.

The HOME account database also contains information on property appraisals, loan payments, and if necessary, features the capability to monitor foreclosed property. Through the integration of image processing and multimedia technologies, visual, verbal and animated video records of property condition, account transactions and documents can be monitored and controlled.

The data structure allocates files for storage of system status reports 290 that are issued during processing to the client and the financial institution's departments and personnel. This information is stored for access and reference by the party to whom the information is reported. For example, a file is provided for each client for the storage of system reports issued to that client 292. The reports are then accessible only by that particular client. The HOME Account manager 294 and supervisor 296 may also have files allocated to them as well as the various departments, e.g., the mortgage servicing department 298 in the financial institution. These files, in a fully distributed system, may be located on any of the system processors or data storage devices.

Although the HOME Account is described as comprising four main areas or files organized according to the HOME client number, many other data structures may be realized within the scope of the present invention. For example, the data may be further distributed into a multiplicity of sub-files indexed according to predetermined data such as client number and type of asset, or the data may be organized in a data structure that is less distributed.

As noted previously, the central element of the HOME Account is the HOME Mortgage. Referring to Table 16 the HOME Mortgage can be described by various elemental categories including: forms of collateral (I), legal documentation (II) and financial terms and conditions (III).

TABLE 16

HOME MORTGAGE ELEMENTS

| I<br>Potential<br>Forms of<br>Collateral | II<br>Legal<br>Documentation | III<br>Terms &<br>Conditions |
| --- | --- | --- |
| Home(s) | HOME Mortgage Master Agreement | Minimum Principal Outstanding Balance |
| Insurance and Annuities | Individual Secured Collateral Agreements | Required Interest Payments |
| Pension and Deferred Compensation Plans | Cross-collateralization Agreements | Amortization Payments or Alternative Investments |
| Banking Accounts | Individual Asset Account Agreements | Fees & Expenses |
| Mutual Funds | Other | Term of Mortgage |
| Forecast Future Income or Cash Flow | | |
| Other Assets | | Other |

The acceptable forms of collateral illustratively include: one or more homes that which would be valued for purposes of collateralization at a percentage of their appraised fair market value, insurance and annuity policies that may be valued for purposes of collateralization at their net fair market or cash redemption value, various forms of pension and deferred compensation plans and accounts that may be valued for purposes of collateralization at their net fair market value, banking accounts including checking and savings accounts to be valued for purposes of collateralization at their net account balances, mutual funds that may be valued for purposes of collateralization at the net fair market redemption value and other forms of alternate collateral.

The required legal documentation for the HOME mortgage may include, but is not limited to, a HOME mortgage agreement, individual security agreements for each of the various assets that are used as collateral for the HOME mortgage, cross-collateralization agreements that allow the value of various asset accounts to be used to support borrowings or indebtedness and individual asset account agreements which include the contractual agreements establishing and setting forth the operations of the asset accounts.

The nature of the derivative financial service products based upon the system of the present invention may require additional documentation to implement the contractual agreements between the financial institution and the customer. Moreover the specifications of the agreements may be altered during the term of the financial service product to reflect any alterations in the nature of the collateral or other component parts of the product. For example the documents for the derivative version of the system of the present invention offered to current mortgage holders may differ from those documents used to implement the system of the present invention for new home owners.

The financial terms and conditions of the HOME mortgage which are substantially new and different from those of conventional financial service products including mortgages include: a continuous real time determination of the permissible outstanding balance of the mortgage which takes into consideration the value of all assets used to collateralize the mortgage; interest payments which can be either in the form of fixed, floating, or a combination of fixed and floating interest payments as determined by the client and lending institution; the variable amortization payments, if any, which may, in the preferred embodiment of the invention, constitute zero amortization payments in exchange for the client making alternative investments in asset accounts of his choice, or paying off or reducing liability accounts of his choice; the prioritization of the allocation of funds to the asset accounts and the liability accounts utilized to maximize the client's financial position during the term or life of the mortgage which would in many instances be of a term of 10 to more than 30 years but could be different dependent upon agreements reached by the lending institution and the client; required fees and expenses for the initiation and continuation of the HOME Mortgage including origination fees, servicing fees, closing costs and prepayment penalties; and other terms and conditions as may be required.

Mortgage Origination and Servicing—Overview

Figure 4:
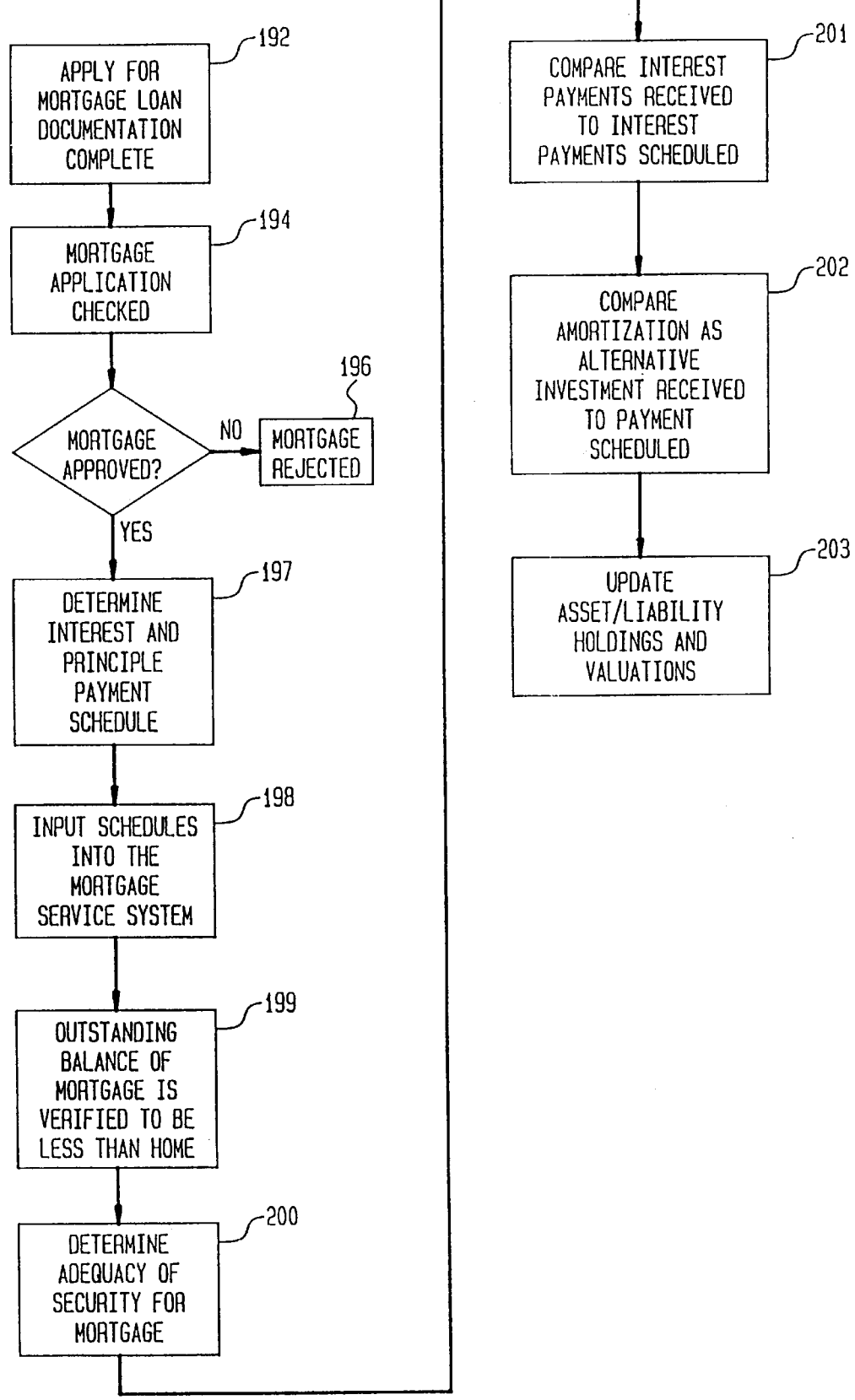
FIG. 4 generally depicts the primary elements of the mortgage process.

Referring to FIG. 4, once the financial service customer completes the loan documentation 192, the loan origination documentation is checked 194 and the HOME Mortgage is approved or rejected 195, 196. If the mortgage is approved, the scheduled interest and principal payments are determined 197 and input into the mortgage service system so that continuous real time verification and cross-verification can be performed to detect any irregularities or delinquencies in payments 198. The payments can comprise fixed or variable amortization. In servicing the HOME Mortgage, the outstanding balances of the HOME Mortgage are processed in real time and compared to the total value of Home Owners Mortgageable Equity (hereinafter called "HOMEquity") 199. (HOMEquity equals NET plus the net fair market appraisal value for purposes of collateralization of the client's home(s)). The adequacy or inadequacy of security for the HOME Mortgage 200, must be determined. The required interest payments received compared to those scheduled at the time of the origination of the HOME Mortgage 201 and as subsequently revised, must be calculated. The updated required amount of principal amortization payments or additional alternative investment required must be calculated and compared to the amounts received 202. Updated-documentation on asset and liability holdings and valuations must be generated 203. In addition, other variables must be periodically calculated and verified to satisfy applicable regulatory authorities and to prevent unauthorized transfers or creation of debit balances in excess of applicable credit limits.

Figure 5:
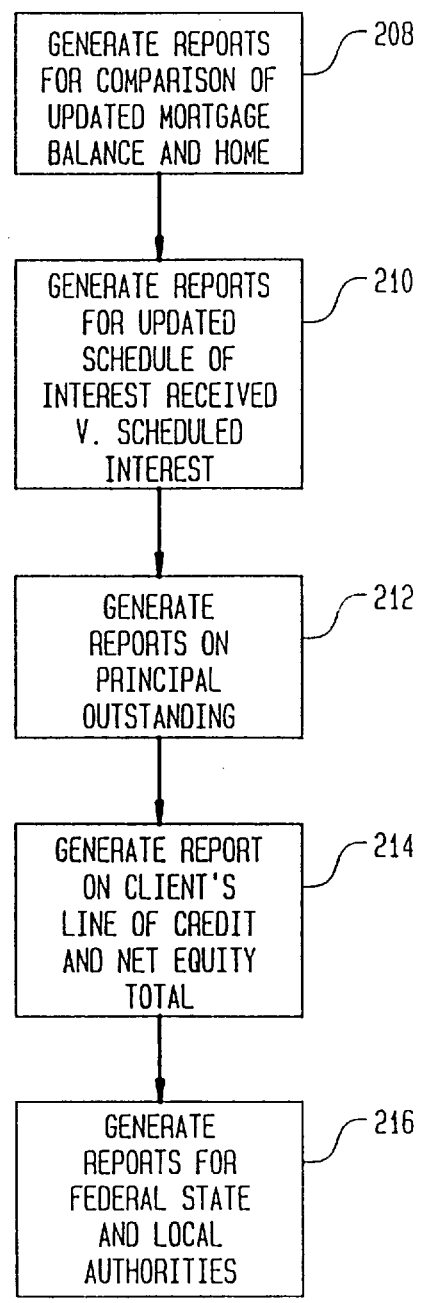
FIG. 5 depicts the mortgage reporting process.

Internal, regulatory and client reporting is an integral part of the system of the present invention. Internally these reports must be updated on a real time basis although the client and regulatory authorities may only receive a report on a periodic basis and when there is a discrepancy or delinquency. As illustrated in FIG. 5, daily updated HOME Mortgage balances must be compared to the HOMEquity value 208 and reported. Likewise, updated schedules of interest received versus interest payments scheduled 210 must be reported. Also updated reports of the amount of principal outstanding 212 must be reported. The client's line of credit and NET 214 must be calculated and reported. Advantageously, the system of the present invention incorporates the use of data visualization and virtual reality techniques in its reporting and document preparation and presentation. Documents incorporating sound and video are automatically generated at the end of reporting periods and transmitted to clients though any one of several selected media.

Reports are also generated for the applicable federal, state and local authorities in compliance with banking, insurance, ERISA and securities laws 216.

Mortgage Origination

Figure 6:
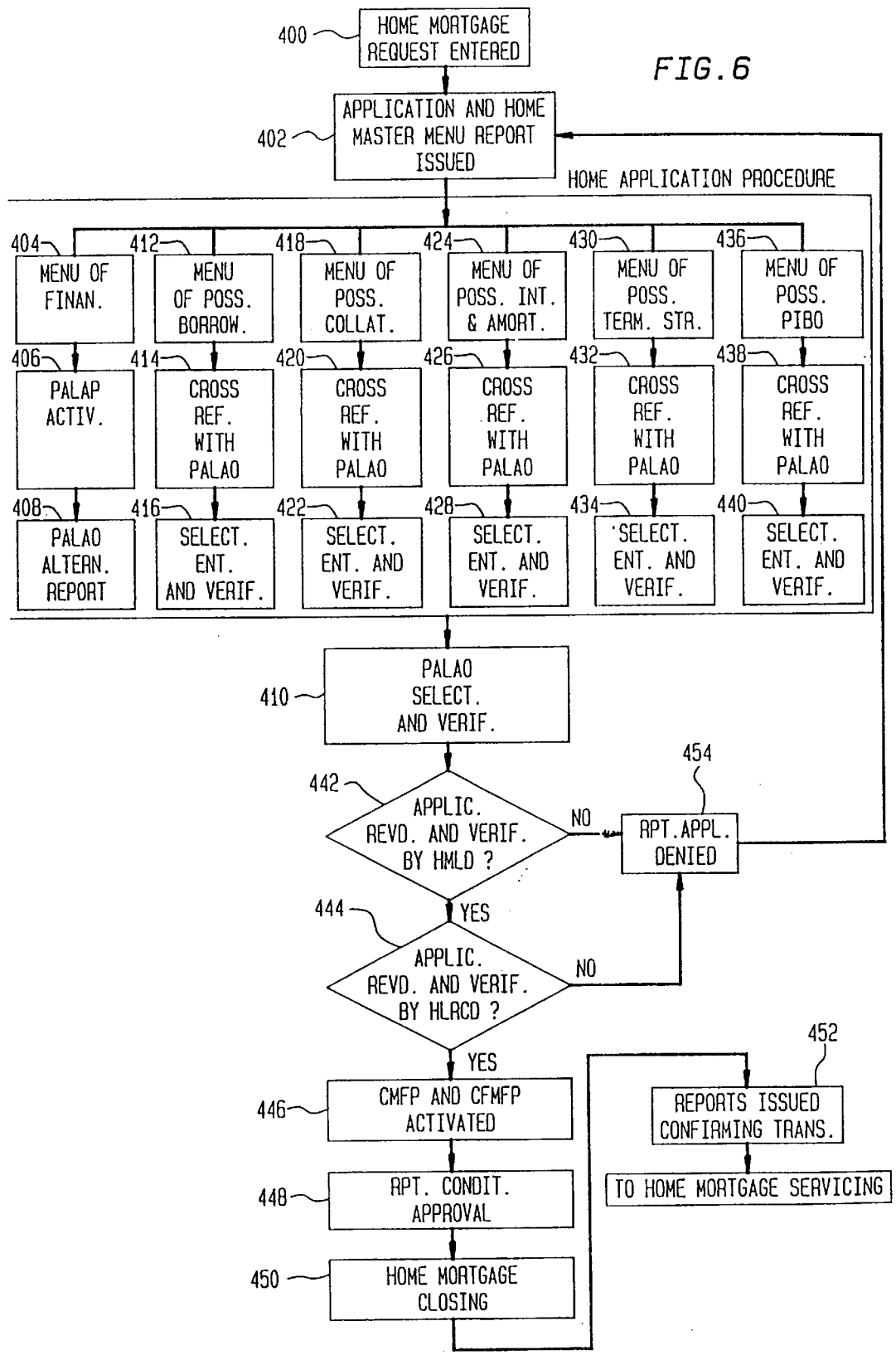
FIG. 6 depicts the mortgage origination process.

FIG. 6 depicts in greater detail the HOME Account mortgage origination process of FIG. 4 which is initiated when the HOME Account client requests a HOME Mortgage 400. The HOME mortgage application process illustrated assumes that the client already has a HOME Account and has access to the HOME central computer through a computer terminal or terminal-emulating computer. A HOME mortgage application menu and the HOME mortgage master menu are presented to the client 402. These two menus include a number of chapters or sub-menus which closely resemble information that must be completed to originate a standard mortgage and others that are uniquely attributable to the HOME Mortgage.

The client reports his qualifications, including financial and employment background, assets owned, anticipated income, etc. 404. This information is standard to almost all mortgage applications. Much of the data may be automatically inputted from the system data structure into his application insofar as the HOME account data files already have information on all assets and liabilities, anticipated income, etc. as part of his HOME Account.

The Priority Asset and Liability Allocation Process (PALAP) is then initiated 406. As will be explained subsequently in conjunction with FIG. 10, PALAP utilizes a type of programming function to perform personal financial planning and analysis and establish a system of priorities for the allocation of funds to asset accounts and liability accounts for each HOME Account. Through PALAP, the system generates for the client a suggested Priority Asset and Liability Allocation Order (PALAO) 408 which can be an improved or an optimal PALAO for the client.

Typically, the PALAO is based on earning the most revenue for the client over a defined time period. However, the client may select one or more alternate financial objectives such as maximizing net worth at retirement. Accordingly, accounts are often prioritized on the basis of economic factors such as interest rates, dividends, forecast returns, or commissions. The client or the financial institution may also request that the accounts be prioritized based on intangibles such as a desire to maintain a certain level of liquidity or simply sentimental value.

Financial statements based on the recommended PALAO are provided to the client to illustrate the effect of the proposed financial plan. These statements may incorporate data visualization techniques and the system of the present invention offers an expert system with interactive explanatory features. A client's PALAO provides the guidelines by which the financial institution governs, regulates and monitors the client account. Updated PALAOs together with financial projections based upon those updated PALAOs may be made available to the client for his review and subsequent selection during the remainder of the mortgage application process.

The client is then presented a menu from which the client may select (1) his desired level of borrowing secured by his home or homes and one or more other assets 412 and (2) other complementary financial service products. This level of borrowing may be of a declining amount over a period of time (i.e., with a certain amount of amortization), it may be for a fixed amount (i.e., non-amortizing), it may be of an increasing amount provided that the client will be able to support the additional amounts of borrowing in the future by increasing the amount of collateral in the account through appreciation of assets currently held or by adding additional assets or income to his HOME Account over time, or it may vary over time according to what is in the customer's best economic interest and consistent with the financial institution's credit standards. The level of borrowing as well as the other financial service products selected may be subject to satisfaction of certain conditions, (i.e., income levels, levels of appreciation or depreciation of capital assets, etc.). The available borrowing alternatives are presented and cross-referenced with PALAO alternatives 414 so that the client can observe how the different levels of borrowings affect his financial planning. Once the client selects the level of borrowing, the selection must be entered into the central computer and verified 416.

The client is then shown various proposed collateral selections from a submenu featuring those items 418. In addition to the home or homes that the applicant desires to use as collateral, he may name a number of other asset accounts by cross-referencing to PALAO alternatives 420. In addition to selecting the asset accounts to be used as collateral, the client must indicate and verify the proposed priority of collateralization of those assets. For example, after the home(s) is used to collateralize the borrowing, the client may wish the next type of collateral to be used to be money market account balances or bank account balances since they have a high loan to value ratio and do not offer low interest cost borrowing as is the case associated with loans against single premium whole life insurance policies and annuities. The client selects the assets to be used as collateral and the priority of collateralization, enters the selections into the central computer and verifies the selections 422.

A client is also presented a menu of potential interest and amortization schedules 424 which includes the priority of funding amortization payments and interest expenses on the proposed mortgage. The client may cross reference to the PALAO alternatives and the level of borrowings selected 426 to see the financial impact the various selections have or the integrated expert system may do this for the client automatically. By cross referencing to the PALAO alternatives a variety of options are presented, and the client selects one of the options and verifies the interest and amortization schedules and the priority of funding amortization payments and interest expenses 428.

The client is also presented with a menu of potential term structures of the HOME Mortgage 430. The effects on the account of the different structures may be seen by cross referencing to the PALAO alternatives 432. The client enters the term structure selected and verifies his selection 434.

The client is then presented a menu of potential Priority Investment and Borrowing Orders (PIBO) 436 that are integrally interrelated to the PALAO presented in block 408. These alternatives may also be cross referenced to PALAO 438 to see the overall effect the different PIBO selections have on the client's account.

Once the PIBO is entered and verified 440, the client selects, enters and verifies the PALAO 410. It should be noted that once the PIBO has been selected, the PALAO will be approximately determined because the PIBO and PALAO selected must be mutually compatible.

In practice, the client switches back and forth among the various menu screens and cross references the alternative PALAOs suggested in order to select a financial package that best meets his needs and objectives or this action may be taken by the expert system of the HOME Account. This cross-referencing may be assisted through the use of an expert system with data visualization and multimedia tools that help the client see the results of selecting different options. Over time the above referenced steps for determining the appropriate PALAO and PIBO and for originating a HOME Mortgage may be periodically redone to assist the client in selecting the financial alternatives that will best help the individual realize his financial objectives given changing economic and financial circumstances.

Completion of the preceding steps finalizes the application process and the completed application is submitted to the HOME Mortgage Loan Department (HMLD) for review 442. If the application is approved by the loan department, the necessary documents are submitted for review by the HOME Legal and Regulatory Compliance Department (HLRCD) 444. An integrated loan evaluator that functions as a decision support tool assists the above-referenced departments with this task. Upon approval, the Cash Flow and Collateral Monitoring and Forecasting Processes (CFMFP and CMFP) are activated so that any interim changes in either the value of the proposed collateral or the projected cash flow of the client can be determined prior to the time of closing of the mortgage 446.

Conditional approval of the mortgage is then reported to the client, the client's account manager, the mortgage loan origination department and the mortgage servicing department 448. A report documenting the approval is also issued to the HOME Account history file. If no adverse change is indicated by the cash flow monitoring and forecasting processes prior to closing, the HOME Mortgage will be closed 450 and reports of its closing will be issued 452.

If the mortgage application is rejected either by the loan department or the legal and regulatory compliance department, then approval is denied and a report is issued to the involved parties stating the reason for its denial. The client is then given the opportunity to make an alternate mortgage application at a later date if desired 454 and to acquire one or more other financial service products.

When the mortgage is originated and its terms and conditions are set, the primary responsibility for the ongoing process of monitoring and servicing of the HOME Mortgage belongs to the HOME Mortgage Servicing Department (HMSD). Over time, any variations in any terms or conditions are reported to the HMSD.

Mortgage Servicing

Figure 7:
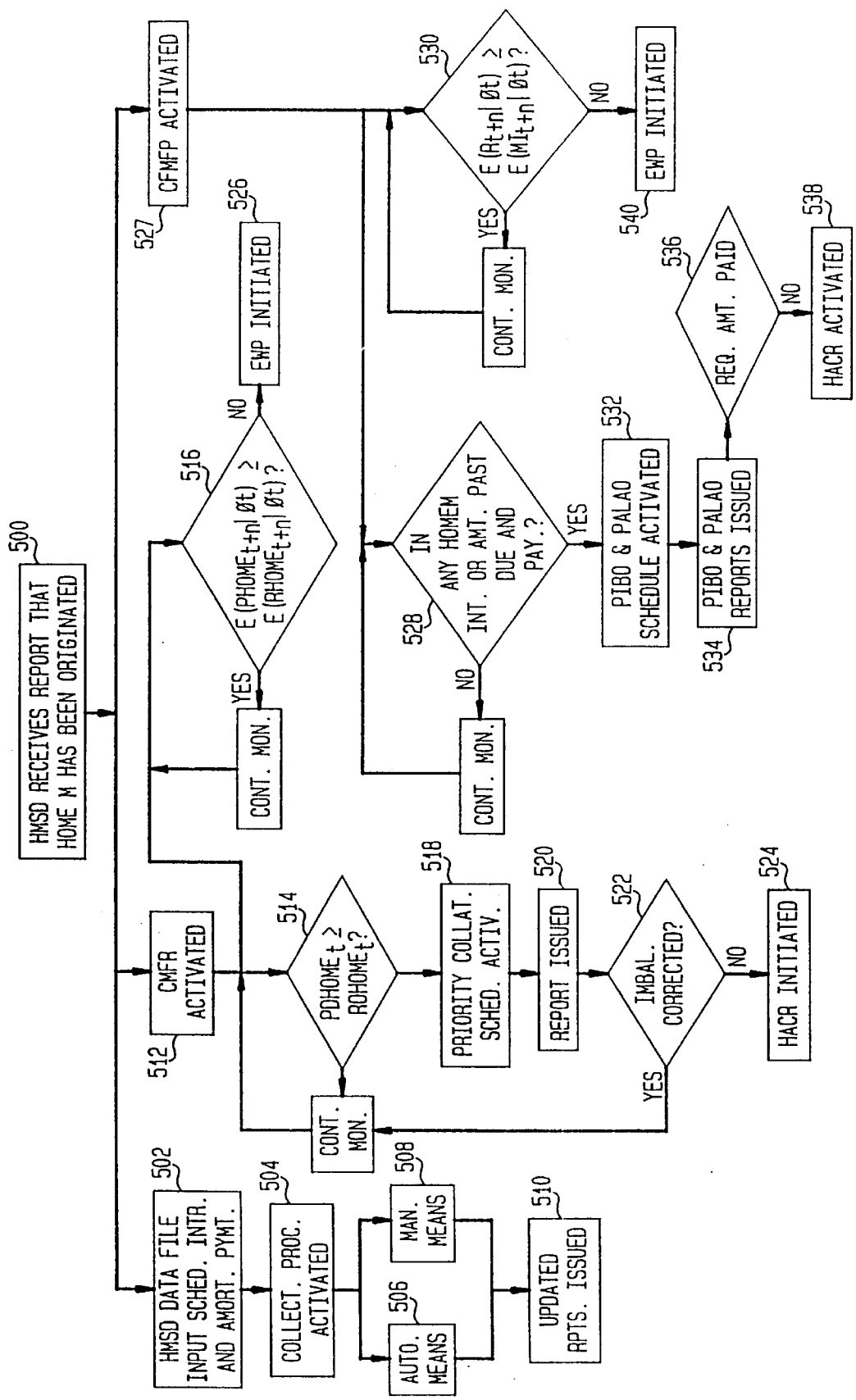
FIG. 7 depicts the mortgage servicing process.

Referring to FIG. 7, the HOME mortgage servicing process is initiated as soon as a report is issued to the mortgage servicing department indicating that a mortgage has been originated 500. One aspect of the HOME mortgage servicing process is virtually identical to the standard mortgage servicing process for a conventional mortgage. This is the collection activity indicated in blocks 502 through 510 with some slight variation due to certain unique attributes of the HOME Mortgage. In step 502, an interest and amortization schedule for the mortgage is input into the mortgage servicing department's data file. This schedule is used to monitor all collection activities 504 which may be done either by automatic or by a manual means 506, 508.

Most mortgage collection activities are currently executed manually, typically by sending a letter to the mortgagee advising him or her of the amount of payment due or recording receipt of a check for the amount of the payment. If the mortgage payment is not received on a timely basis, collection activities are initiated.

Mortgage payments may be made in cash, by check or by various means of electronic funds transfer. Because of the structure of the HOME Account, the client may elect to order transactions to be executed through automatic means of payment, for example, the client's payroll may be debited for the amount of interest and/or amortization payments. The client may also elect to order transactions to be executed through a machine interface such as an automatic teller machine (ATM), an interactive telephone, a personal computer in cooperation with a modem or other means. All of these methods allow the client to order transactions to be executed on his account and all subaccounts herein without direct contact with personnel from the financial institution. The expert system incorporated within the system of the present invention can also automatically or with verification by the client institute payment from any of asset account or credit facilities offered through the system of the present invention. Upon the collection or failure to receive the required funds, updated reports are issued to the client data file, the mortgage servicing department's data file and the master history file 510.

The unique aspects of the HOME mortgage servicing process are necessitated by the wide variety of options available to the client and to the financial institution. Specifically, a variety of planning, coordinating, and supervisory activities must be initiated in order to make sure that the client remains in compliance with the terms and conditions of the mortgage in a constantly changing financial environment. To further aid both the client and the financial institution with regard to compliance, the system provides an early warning process in the event that it is forecast that there will be some future imbalance. The early warning process is discussed later in this specification.

As previously noted, prior to the funding of the mortgage, the collateral monitoring and forecasting process is activated 512. Two tests 514, 516 are performed on the client's net total assets or Home Owner's Mortgageable Equity (HOMEquity) which are defined as equal to the net fair market appraisal value of the client's homes plus the difference between the sum of all assets and the sum of all liabilities (excluding the value of the client's homes). First, in block 514 the amount of pledged HOMEquity must be greater than or equal to the minimum required HOMEquity. Second, in block 516 the amount of expected future pledged HOMEquity (at time t+n) based upon the information currently available at time t must be greater than or equal to the expected value of the minimum required future HOMEquity (at time t+n) given the information base currently available at time t $((E(PHOMEquity_{t+n}|\phi_t) \geq (E(RHOMEquity_{t+n}|\phi_t))$. The variable "t" represents the current time period, "E" is the expected value operator, "$\phi_t$" is the information set assumed to be fully available at time t and "n" represents the incremental value of the future time period determined by the financial institution to be the relevant time horizon. "PHOMEquity" represents the pledged value of HOMEquity and "RHOMEquity" represents the required value of HOME.

If both of these conditions are satisfied, the system merely continues to monitor these values and no further action is taken. However, if in the current period the amount of collateral pledged is insufficient, the priority collateralization schedule chosen by the client during the mortgage application process is used to select other assets from the account that must be collateralized in order to correct the imbalance 518. A report is then issued 520 to the mortgage servicing department data file, the account client file, the account master history file and the account manager stating that the account was out of balance. If however, the imbalance cannot be corrected based on the priority collateralization schedule selected, the account compliance routine, which is explained below, is initiated 524.

Figure 11:
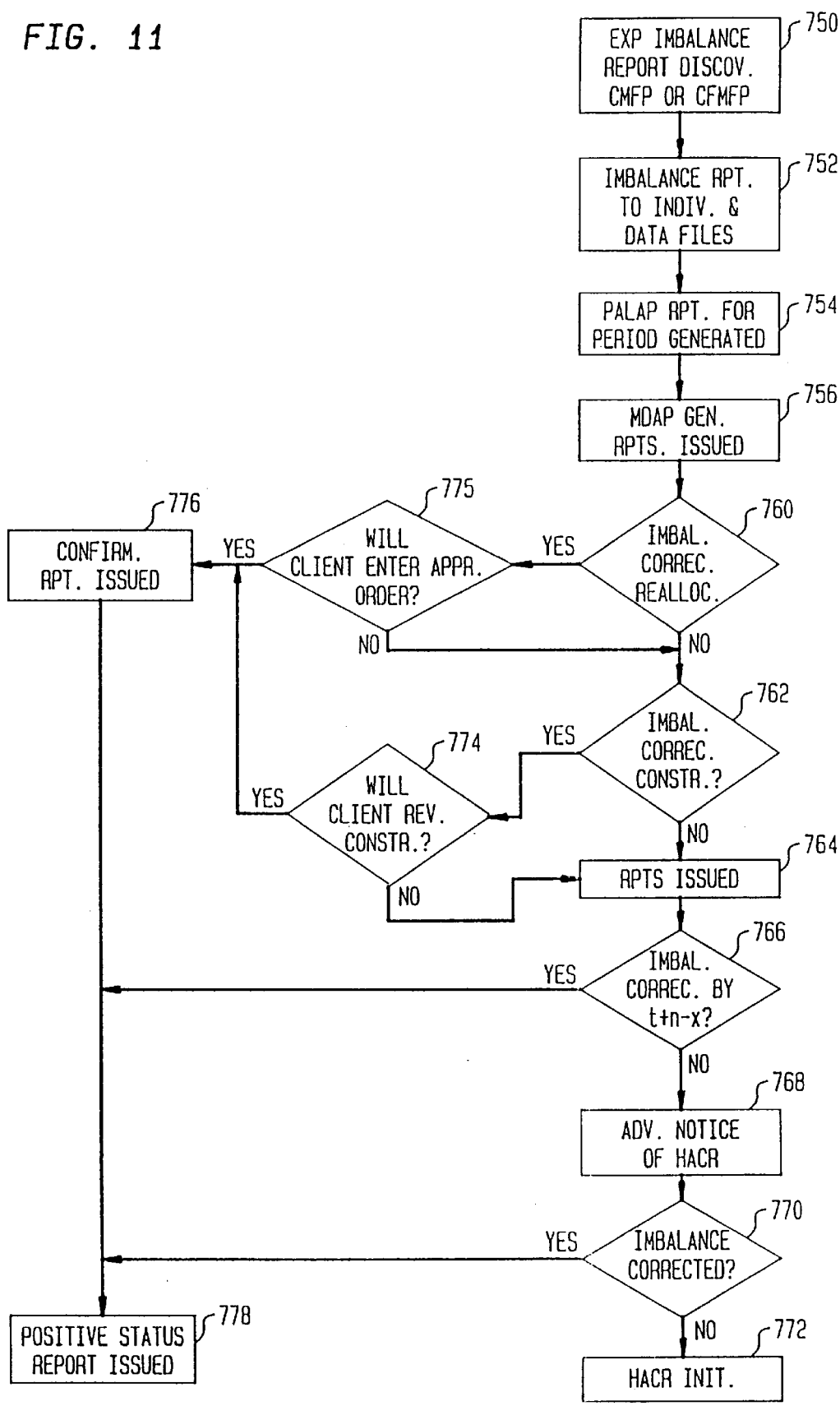
FIG. 11 illustrates an Early Warning Process.

If the expected future value of HOMEquity is less than the amount that is expected to be required in the future, an Early Warning Process (EWP), which is explained subsequently in conjunction with FIG. 11, is initiated 526.

The second form of account supervision and coordination integrated into the HOME Account servicing process is the Cash Flow Monitoring and Forecasting Process 527. This process deals with the flows of financial assets and liabilities as opposed to collateral monitoring process which deals with the stocks (quantities) of financial assets and liabilities. Two tests 528, 530 are conducted. First, is any mortgage interest past due and payable and second, is the expected future total return to be received by the HOME Account client given the set of current information greater than or equal to the expected future amount of mortgage interest and amortization payable at time t: $(E(R_{t+n}|\phi_t)) \geq (E(MI_{t+n}|\phi_t))$ As defined earlier, the variable "t" represents the current time period, "E" is the expected value operator, "$\phi_t$" is the information set assumed to be fully available at time t and "n" represents the incremental value of the future time period determined by the financial institution to be the relevant time horizon. "R" represents the return to be received by the client and "MI" represents the mortgage interest and amortization payable.

If currently no mortgage interest or amortization payments are past due and payable and no shortfalls are expected, the conditions are satisfied and the system continues to perform these tests on a periodic or continual basis.

However, if there are interest or amortization payments past due, the Priority Interest and Borrowing Order (PIBO) previously selected by the client is used to determine how to fund those payments 532. Reports are issued to the client and the account servicing department data file stating the amount past due and period of the deficiency 534. If the required amount plus any penalties are paid 536, the system returns to its monitoring state. If the amount due cannot be fully funded in the manner according to the PIBO selected, the account compliance routine is initiated 538.

If the interest and amortization payments are not past due but the expected future total returns of the client are not greater than or equal to the expected HOME mortgage interest and amortization payments 530, the early warning process is initiated 540.

As will be explained later, because of the variety, flexibility and complexity of the account, certain tests are performed to insure that the account and the components within the account meet the minimum requirements specified by the financial institution and regulatory authorities. In particular, the Home Owner's Mortgageable Equity Borrowing Power (HOMEPW) as defined below must be greater than the minimum value of HOMEPW specified by the financial institution (MIM).

It is preferred that these "checks" are done on a continual basis. However, many of the computer systems actually used by financial institutions cannot manage the processing load imposed by a real time continuous monitoring process for a large number of accounts. The frequency of the checks may be limited to when a transaction request or order is initiated and/or on a periodic basis. As will be illustrated, if the value or status of any component of the HOME Account changes, so do the account balances, inter-component relationships, and future financial projections of the account. Thus, before an order is executed, a "what if" analysis is performed wherein the HOME Account components are changed to reflect the proposed transaction and account balances and ratios are 5checked against the required minimums as dictated by the financial institution and regulatory authorities. In the preferred embodiment of the invention, a "what's best" analysis is also performed to determine if there is an alternate transaction or series of transactions that can be initiated that could better improve the client's financial well-being given the previously designated financial objectives in a manner consistent with the financial institutions credit restrictions. The alternative may be illustrated to the client by means of data visualization techniques.

If the account, taking into consideration the proposed transaction, meets all minimum requirements, the desired order is executed and the account is updated to reflect the transaction. If the account does not meet the minimum requirements, the client is contacted and either the order or some other account component(s) is modified or the transaction order is canceled such that the minimum requirements of the account are maintained.

In addition to performing "checks" prior to the execution of a transaction order, these checks are performed periodically to reflect any changes in the account components not related to a transaction, such as a change in the value of an asset or liability. Although the frequency of the check is chosen by the financial institution, by the client, or mutually by both the client and the firm, the character of the account is an indicator as to how frequently the "checks" should be done. If the account is considered "inactive", i.e. the account has very few transactions and is composed of assets with relatively stable values, the account may only be checked prior to issuing a monthly statement to the client. However, if the client has a portion of his capital in an asset such as commodities futures or options, the value of those assets will change as the price of the commodity or option changes. Therefore the status of the account will be checked more frequently if there is volatility in the value of the account components. The expert system integrated into the system of the present invention considers the various factors and checks the requisite balances at the appropriate sequences.

Processing of Transaction Order

Figure 8A:
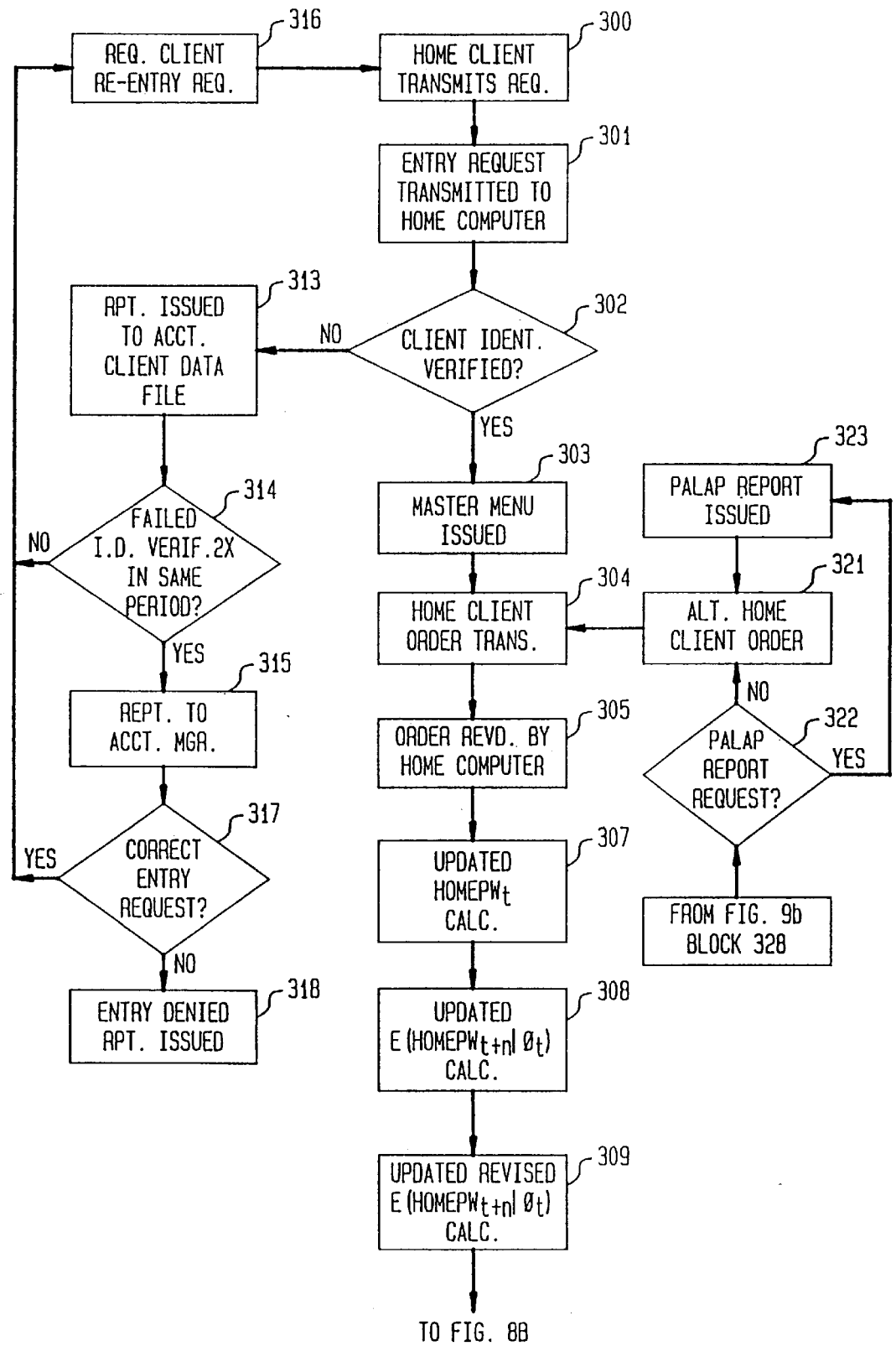
FIGS. 8a, 8b, 8c illustrate a process to effect a client's transaction request in a HOME Account.
Figure 8B:
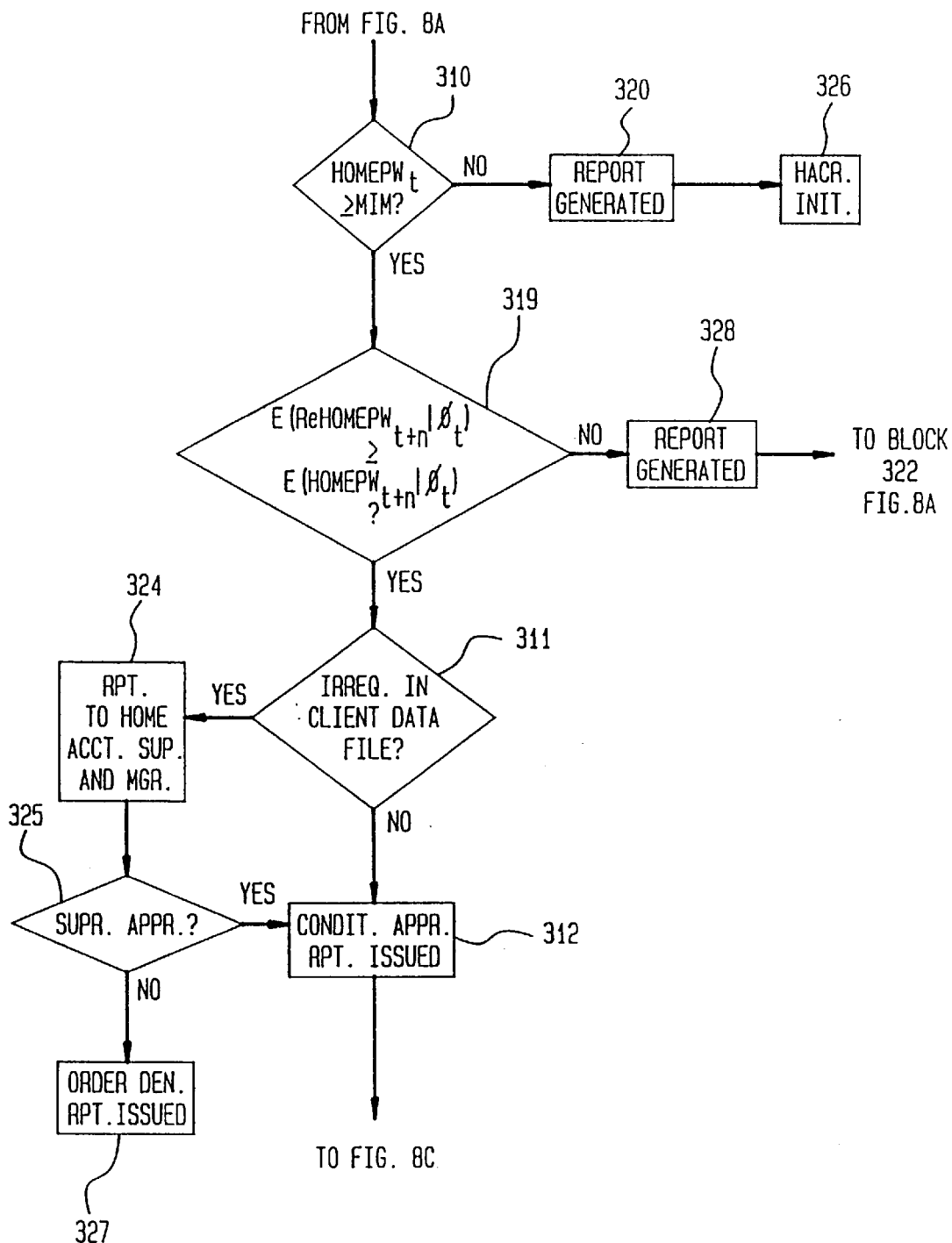
Figure 8C:
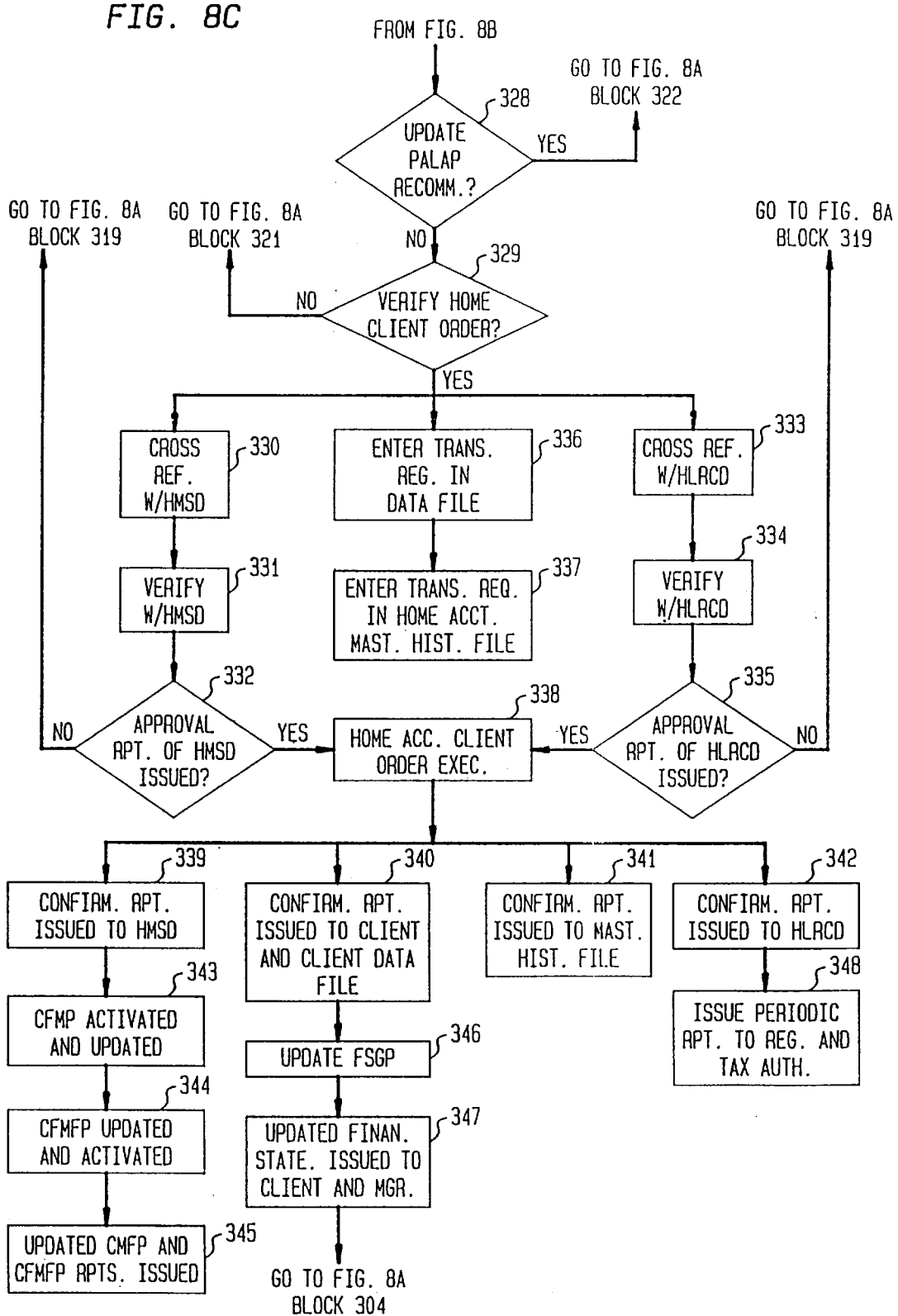

FIGS. 8a, 8b, 8c illustrate the process to effect a client's transaction order. The client first transmits a request to be allowed access to the system 300. This request may be made by the client in person, over the telephone, or via a machine interface (described earlier). The access request would in turn be transmitted to the HOME Account central computer system 301. Before the client's request is processed, the central computer must verify the client's identity 302 by any one of the identification techniques known to those skilled in the art. For example, the client's identity may be verified by entry of the client's secret identification number. In the event that the client identity is not verified, a report is issued to the HOME Account client file 313, and the file is cross referenced to determine whether there have been more than two failures to verify the client's identity within a predetermined time period. If that is not the case, the individual is permitted another attempt to verify the client's identity. If there have been two or more failed verification attempts within the predetermined time period, a report is issued to the account manager 315. The account manager examines the report and tries to correct the problem 317, typically through communication with the client. If the problem is solved, the client is requested to reenter his request 316. If the problem is not solved, the request is denied and a report is issued denying the purported client access to the system 318. Records of all of attempts are entered into the customer information file and this and other data are periodically analyzed by the expert system of the present invention.

If the client's identity is verified, the HOME Account master menu is presented to the client for his review and selection of the transaction desired 303. The client transmits the transaction order to the HOME Account master central computer 304, where the order is received and processed 305.

Before the transaction order is processed, however, the order must be approved. The system determines whether the transaction will affect the account balances such that the account status is outside the limits specified by the financial institution and the regulatory authorities. First the central computer must calculate the updated values of the Home Owner's Mortgageable Equity Borrowing Power at the present time t (HOMEPW$_t$) 307, an updated forecast of the client's expected HOMEPW throughout the future given current information and the client's current and expected future asset/liability configuration (E(HOMEPW$_{t+n}|\phi_t$)) 308; and an updated revised expected HOMEPW throughout the future given current information (E(ReHOMEPW$_{t+n}|\phi_t$)) based upon the client's requested transaction 309. The variables "t", "E", "n" and "$\phi$" are as previously defined and "Re" represents that the variable is revised based on a potential transaction.

Once these variables have been calculated, the central computer determines whether HOMEPW, is greater than the Management Imposed Minimum HOMEPW (MIM) and whether the revised estimated future HOME Borrowing Power (Revised E(HOMEPW$_{t+n}|\phi_t$) is greater than what the HOME Borrowing Power would be if the transaction is not entered into (E(HOMEPW$_{t+n}|\phi_t$)).

Referring to FIG. 8b, if HOMEPW$_t$ is below the MIM, a report is issued to the client and the account manager 320 and the account compliance routine is initiated 326. If HOMEPW$_t$ is equal to or above the MIM, E(ReHOMEPW$_{t+n}|\phi_t$) is then compared to E(HOMEPW$_{t+n}|\phi_t$) 319. If the revised expected future HOME Borrowing Power is less than the expected future HOME Borrowing Power, a report is issued to the client and account manager 328 and the client is given the choice of entering an alternate order that will increase the expected future HOME Borrowing Power 321 or requesting that PALAP be initiated 322 to generate a report 323 recommending reallocation of assets and liabilities for the current and/or future periods in order to increase future HOME Borrowing Power such that the revised expected future HOME Borrowing Power is greater than or equal to the expected future HOME Borrowing Power. The client may then select one or more of these recommendations to be transmitted to the system as an order request 321 to increase the future HOME Borrowing Power, although a client will not be prohibited from entering an order provided that the revised expected HOMEPW$_{t+n}$ is greater than the expected MIM that is forecast to exist at time t+n.

If HOMEPW$_t \geq$ MIM and E(ReHOMEPW$_{t+n}|\phi_t) \geq$ E(HOMEPW$_{t+n}|\phi_t$), the transaction request or order is cross referenced with the client history data file to ensure there are no past irregularities concerning the client's account 311 such as an excessive number of large cash transfers, repeated overdrafts, or past due interest payable. If no irregularities are found in the client's account history, the client is issued a conditional approval report 312. A copy of that same report is also issued to the account manager.

If the expert system detects irregularities, a report is immediately issued to the account supervisor and the account manager 324. The account supervisor reviews the report 325 and determines whether to deny the order 327 or to approve it despite the past irregularities. If the supervisor approves the order, a conditional approval report 312 is issued to the client and the account manager. The account supervisor may also take other action such as recommending that the client consider other transaction order alternatives or make an alternate order. If the supervisor denies the order, a report is issued to the client, master history data file and account manager. The activities of the account supervisor may be assisted or performed by a decision support or expert system.

Referring to FIG. 8c, the client is asked whether he desires to have PALAP rerun so that he may better understand how to better reallocate his assets and liabilities or to update his financial plan and/or optimize the net return from his investment and borrowing transactions 328. If the client does not desire another PALAP recommendation, the account transaction order is verified by the client 329 and the mortgage servicing department and the legal and regulatory compliance departments are notified of the order. The transaction order data is entered in the client data file 336 and the account master history file 337. If the order is not verified by the HOME Account client because of incorrect data transmission or other causes, the system returns to the process sequence depicted at 321 which permits the client to modify the order.

The mortgage servicing department, upon receiving notification of the order, cross references the order with its mortgage account files 330, verifies the effect of the proposed transaction 331, and either approves or disapproves the order 332. Similarly, the legal and regulatory compliance department cross references the proposed transaction order with legal and regulatory guidelines 333 to verify the effect of the proposed transaction on applicable statutes 334 and issues an approval or rejection 335.

If the order is approved by both departments, the transaction order is executed 338 and copies of confirmation reports are issued to the mortgage servicing department 339, the legal and regulatory compliance department 324, the client and client data file 340 and the customer information file 341.

Upon receipt of the confirmation report by the mortgage servicing department, the collateral and the cash flow monitoring and forecasting processes are activated 343, 344. Both the collateral and cash flow monitoring processes are discussed in detail later in this specification. Reports reflecting the updated collateral and cash flow values are issued to the client data file, the account master history file and the legal regulatory and compliance file 345.

The legal and regulatory compliance department stores the confirmation order for use in generating periodic reports to the appropriate legal, regulatory and tax authorities as required by applicable law or regulatory statute 348.

Once the client's customer information file has received confirmation of the executed order 340, the client's financial statements (balance sheet, profit and loss statement, sources and uses of funds statement and actual vs. budgeted income and expense statement) are updated 346. Updated financial statements and confirmations are issued to both the client and the account manager 347.

Calculation of HOMEPW

Figure 9:
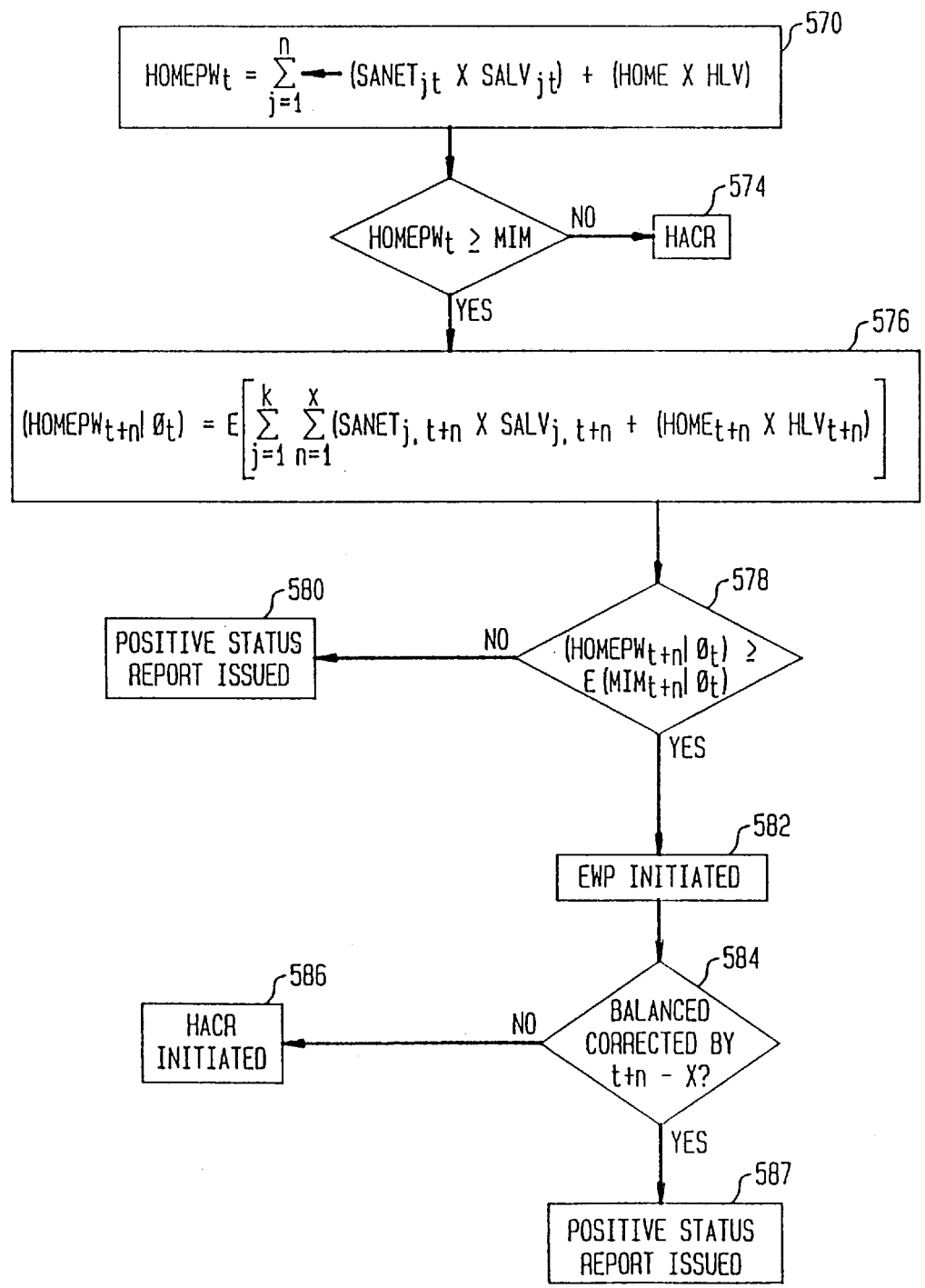
FIG. 9 illustrates a process for updating and verifying the Home Owner's (HOME) Equity Borrowing Power.

As stated earlier, the levels of transaction activity and price volatility of the account indicates how often an account is updated. The client's account is checked by updating and verifying the present and future Home Owner's Mortgageable Equity Borrowing Power (HOMEPW). FIG. 9 depicts the process for updating and verifying the HOMEPW at time t (HOMEPW$_t$) and the expected future value of HOMEPW$_t$ given the amount of information currently available at time t (E(HOMEPW$_{t+n}|\phi_t$)).

HOMEPW$_t$ is equal to the sum of each sub-account asset loan value which is the net asset value or Net Equity Total of each sub-account (SANET$_j$) multiplied respectively by the sub-account Loan to Value Ratio (SALV$_{jt}$) added to the product of the assessed value of the client's Home and the home Loan to Value Ratio (HLV) 570. The variables "t", "n", "$\phi$" and "E" are as previously defined and the variable j represents the subaccount number for each type of asset or liability sub-account possessed by the client.

Once HOMEPW$_t$ has been calculated, it is compared to the minimum HOMEPW$_t$ specified by the financial institution (MIM) 572. This figure will vary depending upon the overall size of the account, its level of activity and the credit record of the individual HOME Account client. If the HOMEPW$_t$ is not greater than or equal to MIM, then the account compliance routine is initiated 574.

In the event that the balance is corrected during execution of the account compliance routine or that HOMEPW$_t$ is in excess of or equal to MIM, the expected future HOMEPW based on the set of information available at time t is calculated 576. E (HOMEPW$_{t+n}|\phi_t$) is equal to the product of the expected future value of the product of all sub-accounts' Net Equity Total (NET) and their respective expected future loan to value ratios added to the product of the expected future value of the home(s) owned by the HOME Account client and the expected future loan to value ratio of the home(s). The forecasted values are calculated utilizing an econometric analysis technique which is based, at least partially, on historical data. The time period under consideration will vary from t+1 (i.e., the next period) through t+n.

After the expected future value of HOMEPW$_t$ is calculated, the value is compared to the expected future MIM value 578 based on the current set of information available (E(MIM$_{t+n}|\phi_t$)). It is possible that MIM may be forecast to vary over time as management may elect to either strengthen their credit standards or reduce their credit restrictions on HOME Account clients based on past performance or anticipated market conditions. If the expected future HOMEPW$_t$ is greater than or equal to the expected future MIM, a positive status report is issued 580 indicating that the account is in good standing. In the event that the expected HOMEPW$_t$ is not adequate, the early warning process is initiated 582 to notify the financial institution and the client of the possible future imbalance. Unless the balance is corrected within a time frame deemed appropriate by management 584, e.g. the time period immediately prior to the time period in which a deficiency is forecast to exist, the account compliance routine is initiated 586. If the balance is corrected within the appropriate time frame, a positive status report is issued 587.

Management may require that assets and liabilities be immediately reallocated upon detection of a forecast future imbalance. In most instances, however, this will not be necessary unless the forecast imbalance is substantial. Alternatively the expert system of the present invention may automatically institute a reallocation of assets and liabilities in a manner that best serves the financial interests of the client and satisfies the credit related requirements of the financial institution.

Priority Asset and Liability Allocation Process (PALAP)

Figure 10A:
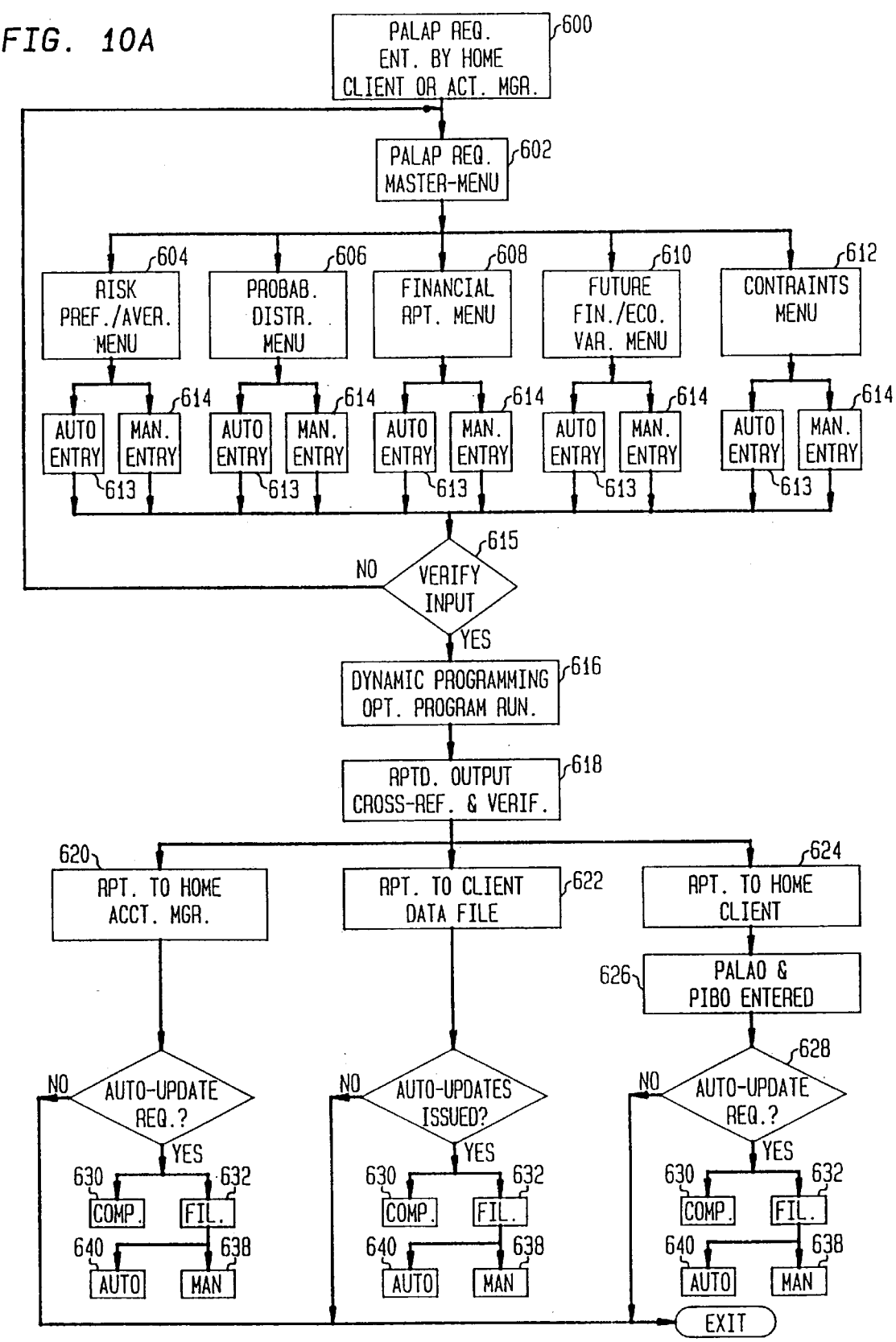
FIGS. 10a and 10b illustrate a Priority Asset and Liability Allocation Process.

FIG. 10 depicts the Priority Asset and Liability Allocation Process (PALAP). Advantageously, operations research techniques such as goal, dynamic, linear, nonlinear and integer programming functions, a goal programming function, a multiobjective programming function or a combination of the above-identified functions may be used to establish a priority for the allocation of account funds. Further, optimization or sub optimization methods, utilizing expert or decision support systems and incorporating the findings of the modern portfolio theory and the capital asset pricing model, can be utilized with these operations research techniques. PALAP generates a Priority Asset and Liability Allocation Order (PALAO) and a Priority Investment and Borrowing Order (PIBO) for the client's account. PALAO and PIBO are of great value to the HOME Account client because they show the client the optimal allocation of assets, liabilities, net cash flows and net borrowing requirements over a defined period of time ranked in a prioritized order.

PALAO and PIBO are guidelines through which the financial institution can supervise and regulate the actions of a multiplicity of clients who potentially have an infinite number of investment opportunities available to them and by which the financial institution is provided a defined means of satisfying MIM in the event that there is an imbalance in the account. PALAO regulates the level of asset and liability holdings, while the PIBO regulates the flow of cash into and from assets and liabilities. By executing PALAP, the system generates a preferred allocation of assets and liabilities comprising a PALAO and PIBO based on system default variables and a client directed allocation of assets and liabilities comprising a PALAO and PIBO based on variables specified by the client.

The priority asset and liability allocation process is initiated 600 when a client applies to open a HOME Account or applies for a HOME Mortgage. However, the system may also be activated at any other time at the client's, the account manager's or the account supervisor's request. When the process is initiated, the central computer issues a PALAP master menu to the account client 602. The master menu contains five options for the selection of sub-menus: an investment risk preference/risk aversion menu 604, a probability distribution menu 606, a financial report menu 608, forecasted future economic variables menu 610, and a constraints menu 612. The client selects the menus one at a time so that the information contained therein may be added to or modified. The information contained in each menu may be displayed graphically utilizing enhanced data visualization techniques.

The investment risk preference/risk aversion menu 604 contains information regarding the degree of risk the client is willing to accept with his investments and borrowing. For example, the client may be willing to accept substantial risks by investing in the commodities futures market or by borrowing heavily. The probability distribution menu 606 contains information regarding the level of certainty and/or uncertainty regarding future events. The financial report menu 608 includes information concerning a client's current balance sheet, income statement and sources and uses of funds. The future economic variables menu 610 contains information concerning predicted future values of economic variables used in financial calculations such as the future HOME Borrowing Power. The menu of financial and budgetary constraints 612 contains information and account restrictions which may be specified by the client, by the financial institution or by regulatory authorities. The data for each menu may be displayed numerically or illustrated graphically so as to enhance the customer's understanding of the data input.

Each of the menus can be completed by either automatic entry means 613 (default mode) or by manual entry means 614. For example, if a client does not wish to complete the risk preference/aversion menu 604, he may simply specify certain personal financial data that may be automatically inputted by the system from data generated for existing HOME Account clients; and assumptions concerning risk preference/aversion will be automatically entered as the appropriate answers of the menu. Likewise, the probability/ distribution menu 606 may be completed automatically through default variables by assuming a normal distribution of the forecast financial variables. The financial report 608 may be completed automatically for clients already having a HOME Account by using the balance sheet, sources and uses of funds and income statements in the client's data file. Information concerning future income and expense items are also contained within the client data file, particularly information related to future salary income and yields on securities held within the HOME Account. The forecast of future financial and economic variables 610 utilized by the financial institution can be entered automatically by incorporating an economic forecast derived from published governmental forecasts, historical data or from internal economic reports generated by the financial institution. The menu of constraints 612 may automatically incorporate a default set of constraints stored in the central computer. However, budgetary and other financial constraints are typically subject to individual preference; and usually a client will choose to manually input this information.

After all of the menus have been completed or modified, the input is verified by the client 615. If there is an error in input, the process returns to the master menu 602, through which the client may choose to alter various menu items. After the menus have been verified, the expert system determines the appropriate prioritization or optimization function to be utilized, as described above. A series of reports 616 is generated which present a prioritized or an optimum combination of asset and liability holdings given a set of constraints and a defined time horizon to realize the client's financial objectives. These programming functions perform constrained optimization or prioritization, i.e. the process endeavors to find a solution to a problem where constraints are defined as limits. Although any of the several varieties of programming functions may be used in connection with the invention, the expert system of the present invention determines one or more problem solving techniques that provide a recommended prioritization to realize the client's objectives.

The nature of financial markets and the behavior of individuals seeking to maximize their returns in financial markets is dynamic, that is, the solution generated to personal financial planning problems should take into consideration the change in variables over time as well as the rate of change of variables over time. Accordingly, a form of multi-period or dynamic programming may often be recommended as one type of programming function that may be used in the preferred embodiment of the invention. In so far as many clients have multiple objectives, goal programming and multiple criteria description making techniques may be implemented. The entries specified through the constraint menu 612 present a set of constraints that must be considered in generating the financial solution for the client. Thus, the PALAO and PIBO generated through this process define the financial solution to best realize the client's financial objectives specified through the menus.

The reported output is then cross referenced to the client account files and verified 618. Reports are then issued to the account manager 620, client account data file 622 and the client 624. The reports include a HOME Account client balance sheet over a defined period of time, a sources and uses of funds statement for the designated time period, an income, profit and loss statement for the time period considered, and a recommended PALAO and PIBO.

As will be readily apparent to those skilled in the art, the PALAO and PIBO recommended by the system of the present invention represent one or more financial service products that may be decomposed into a series of current and forecast future cash flows and asset and liability account, balances over time with inherent levels of risk and uncertainty concerning each of the forecast future values. The output of the PALAO and PIBO may refer to an allocation of preexisting types of assets and liabilities that comprise part of the asset and liability accounts or equivalently, they may alternatively refer to the creation of one or more derivative financial service products that result in the desired future cash flows, asset and liability account balances and risk levels.

Returning to the example set forth in Tables 1–3, the PALAO and PIBO may recommend to the client a HOME Mortgage, a pension related investment and an insurance-related investment as set forth in the earlier example or it may equivalently recommend a derivative financial instrument that features essentially the same cash flows, account balances, and risk and uncertainty levels. This derivative financial investment may take the form of a contractual agreement between the financial institution and the client whereby the parties agree to a schedule of cash flows, guaranteed account values and security interests between and among the parties. For example, the derivative instrument might effect one or more contractual agreements whereby the financial institution agrees to advance $100,000 to the customer on the signing of the contract; the customer agrees to make periodic payments of interest to the financial institution according to the agreed schedule and periodic allocations of cash flow to the institution in amounts equal to what under the prior example would have been used to increase the pension and insurance account balances; the customer grants security interests in various account balances to the institution up to an agreed amount; and at the conclusion of the term of the agreement, the customer agrees to pay $100,000 to the financial institution and the financial institution agrees to release all of its secured interests and deliver the equivalent of the pension and insurance account balances to the customer in a lump sum or in periodic payments. Various contingencies can be engineered into the derivative product that will permit greater flexibility to each party. Additionally, various add-on features such as credit enhancement or insurance by third parties may be seamlessly integrated into the derivative.

The utilization of the PALAO and PIBO to recommend derivative forms of financial instruments can also easily accommodate examples in which the customer has one or more pre-existing financial instruments with other financial institutions that cannot be easily transferred to the HOME™ Account or where the customer or the financial institution do not desire to transfer the financial products because of cost or other considerations. For example, consider the circumstance in which a prospective customer desires to receive the numerous benefits of the HOME™ Account and Mortgage, but he has a well-seasoned 6% fixed rate mortgage. The prospective client, the account manager or supervisor requests that the PALAP be initiated 600; the PALAP master menu is issued to the account client 602; the client selects the PALAP submenus (604, 606, 608, 610, 612); completes the menus by either manual 614 or automatic entry menu 613; and verifies the input 615. In completing the financial menu 608 by manual 614 or automatic entry means 613, the fact that the prospective client has an extremely beneficial 6% fixed interest rate existing mortgage is input into the system. When the PALAP prioritization function is run, the PALAO and PIBO generated and the reports issued 616 will reflect a prioritized allocation of assets and liabilities that may offer the client the benefit of the HOME™ account and Mortgage but recommend that he not change his preexisting mortgage arrangement. The PIBO and PALAO may recommend a derivative financial instrument that is comprised of a series of loans secured by the home and one or more other asset accounts up to a specified amount. Specifically, these loans might be made periodically at the time payments are made on the preexisting mortgage in amounts which equal at least the amortization portion of the payments on the preexisting mortgage. In this way the client will be advanced funds in an amount sufficient for him to continue making payments on the preexisting mortgage but also have sufficient additional funds to invest in savings, insurance and pension-related accounts so as to maximize total retirement benefits.

Figure 14:
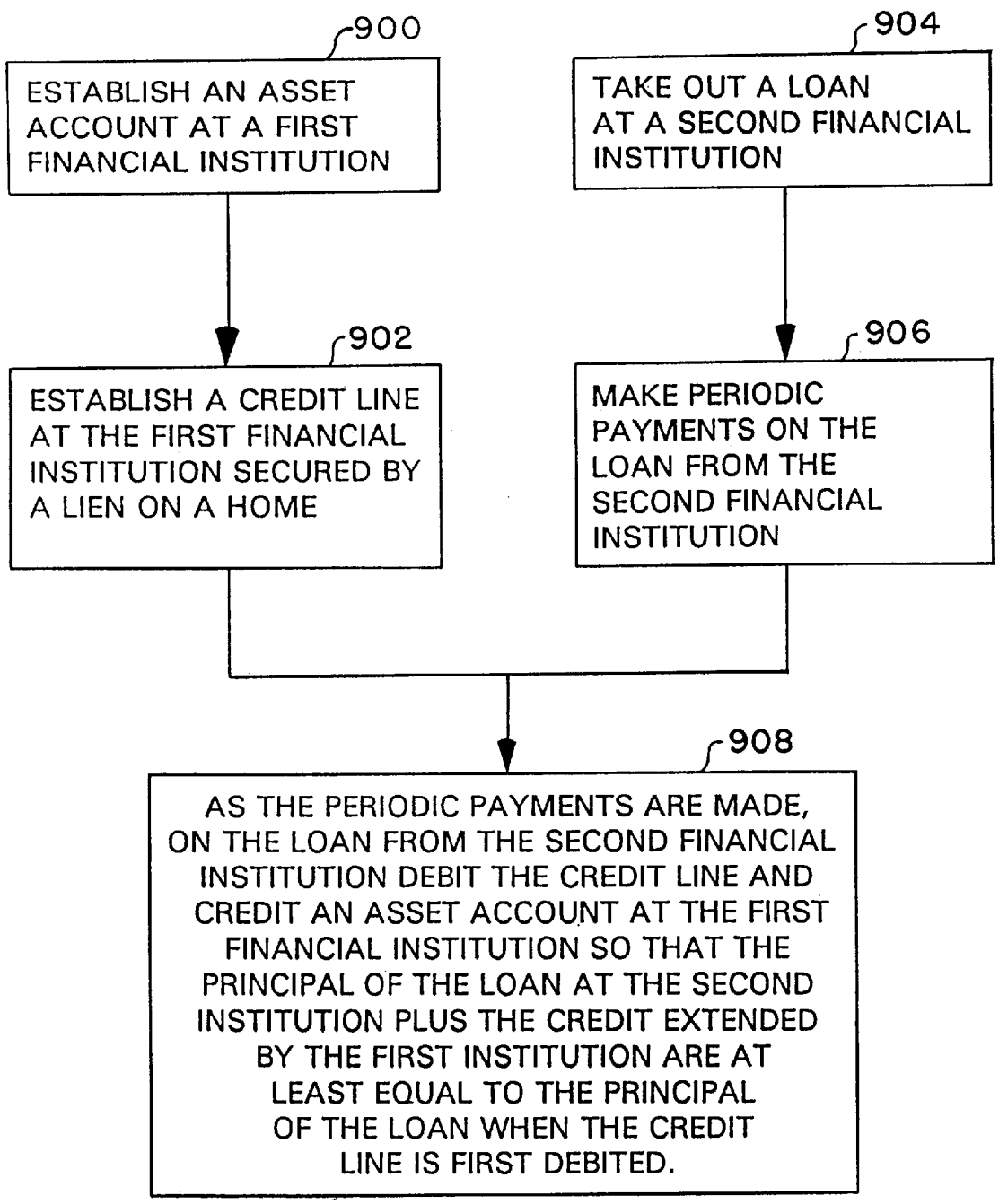
FIG. 14 illustrates a specific application of the invention in the case of a pre-existing loan.

An example of such a derivative financial instrument is illustrated in FIG. 14. In this example, a client would establish an asset account 900 and a credit line 902 which is secured by a lien on at least one home at a first financial institution. Additionally, the client would take out a loan 904 at a second financial institution. The client can perform these activities concurrently or separately. For example, the client may establish the asset account and credit line at the first financial institution at the same time that he takes out the loan in the second financial institution, or the client may already have an outstanding loan at the second financial institution when he decides to establish the asset account and credit line at the first financial institution. In either case, when all accounts are established the client will make periodic payments to the loan at the second financial institution 906. As the periodic loan payments are made, the credit line will be debited and the asset account will be credited with the loan payment 908. The financial instrument can be maintained so that the principal of the loan at the second institution plus the credit extended by the first institution equal the principal of the loan when the credit line is first debited. The client can make the periodic loan payments to either the first financial institution or the second financial institution. If he pays the first financial institution, that institution can make the periodic payments to the second institution.

After the reports have been issued, the HOME Account client will be requested to accept or modify the suggested PALAO and PIBO 626. An automatic update of these reports may be requested 628 either in full presentation form 630 or alternatively, in a filtered form 632 which highlights only the modified variables. The filtered variables may be manually selected 638 or automatically selected according to a system default set of variables 640. For example, a client may only be interested in receiving an updated report if a change in an economic variable is going to affect his retirement income or a client may be indifferent to changes in economic variables that insignificantly affect his portfolio holdings.

After the reports are issued, the client and the account manager have the option to run PALAP again by repeating the process starting at the step represented by block 600.

For example, the client may prefer to select a real-time updated version of PALAO and PIBO based upon a PALAP updated with respect to changes in key financial variables such as changes in interest rates on borrowing costs, dividend yields on common stock prices, and returns offered on various types of annuities.

Figure 10B:
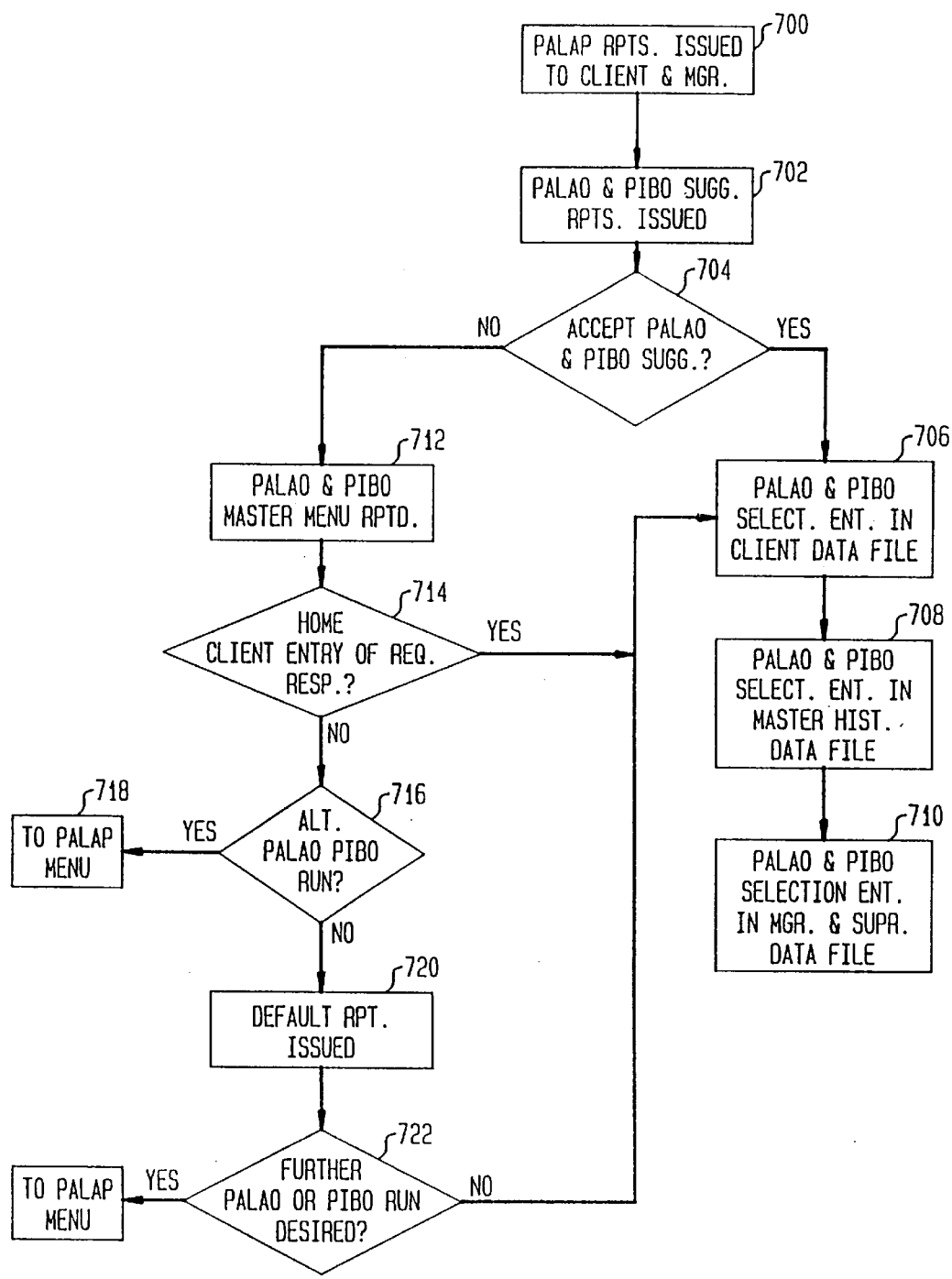

Referring to FIG. 10b, if the HOME Account client selects the recommended PALAO and PIBO, a record of this is entered into his client file 706, the account history file 708, and the mortgage servicing department master file 710. If the client chooses not to follow the system's recommendations, the client is given the opportunity to designate a PIBO and PALAO 712. Once the HOME Account client completes the master menu 714, his selections are entered in the system files as represented in blocks 706, 708 and 710.

If the client rejects the automatically generated PALAO and PIBO and he does not designate a PALAO and PIBO, the client is offered the opportunity to generate alternate PALAOs and PIBOs 716. If the client desires an alternate PIBO and PALAO, the process returns to the PALAP main menu where the client is given the option to change his responses to the PALAP menu previously completed 718. If the client does not want to change what was previously specified or he does not desire to specify an alternate PALAO and PIBO, then he is notified 720 that the PALAO and PIBO first recommended to him will be applied automatically to his account and will be used for allocating his future net cash flows and borrowing requirements. After the report is issued, the client is offered another opportunity to designate an alternate PALAO and PIBO and rerun PALAP 722. If the client does not desire to run PALAP again, the system recommended PALAO and PIBO and the default PALAP is entered and reported to the appropriate data files represented in blocks 706, 708 and 710. As will be clear to anyone trained in the art, the selection of the PIBO and PALAO constitutes the selection of an array of asset accounts and liability accounts that when viewed as a whole may constitute one derivative or synthetic financial service product or may be decomposed into a set of interrelated derivative or synthetic financial service products.

Early Warning Process

Referring to FIG. 11, the Early Warning Process (EWP) alerts both the internal management of the financial institution and the client of expected future imbalances that are forecast to occur. If at 750 the system reports a future imbalance expected at time t+n, notice of the expected imbalance is immediately reported to the client, the account manager and the mortgage servicing department 752. Financial reports are issued to the HOME Account client and the HOME Account manager concerning the relevant time period of the imbalance 754 and PALAP is run in order to generate a current PALAO and PIBO having potential solutions to the imbalance 756.

The financial reports generated by PALAP are then sent to the client and the account manager. The financial report will indicate if the imbalance can be corrected by the reallocation of assets and liabilities among different accounts or subaccounts either prior to or at the time of the anticipated imbalance 760. If the reallocation of assets and liabilities is not sufficient to correct the anticipated future imbalance, the system will indicate whether or not modification of some of the specified constraints on the system (e.g. desired levels of consumption spending) will be sufficient to correct the imbalance and if so, what specific changes to the constraints should be made 762.

If the imbalance cannot be corrected or if the client will not agree to take the appropriate action suggested 774, 775, a report is issued to the account supervisor, the account manager, the mortgage servicing department and the client 764. If the imbalance is forecast to exist at time t−n, and if at 766 the imbalance has not been corrected by the time t+(n−x), where x is a value defined by the financial institution to be equal to the number of time periods prior to the anticipated occurrence of the imbalance by which time the imbalance must be corrected, an advance notice of the implementation of the HOME Account Compliance Routine (HACR) 768, is issued to the client, the account manager, the account supervisor and the mortgage servicing department. If after notice the imbalance is still not corrected 770, then the account compliance routine is initiated 772.

Even if a client may not reallocate his assets or liabilities or modify the constraints on the PALAP, it is still possible that the forecasted imbalance will not occur at time t+(n−x) since, for example, the returns on the client's stock portfolio may be greater than expected or the client may contribute additional assets to his HOME Account at some time prior to the date of the anticipated balance.

If the forecasted imbalance does not occur or if the client revises his constraints and/or reallocates his assets and liabilities to avoid the imbalance, confirmation reports are issued 776 indicating the change in status and a positive status report is issued 778 to all those parties previously notified of the imbalance.

HOME Account Compliance Routine

Figure 12:
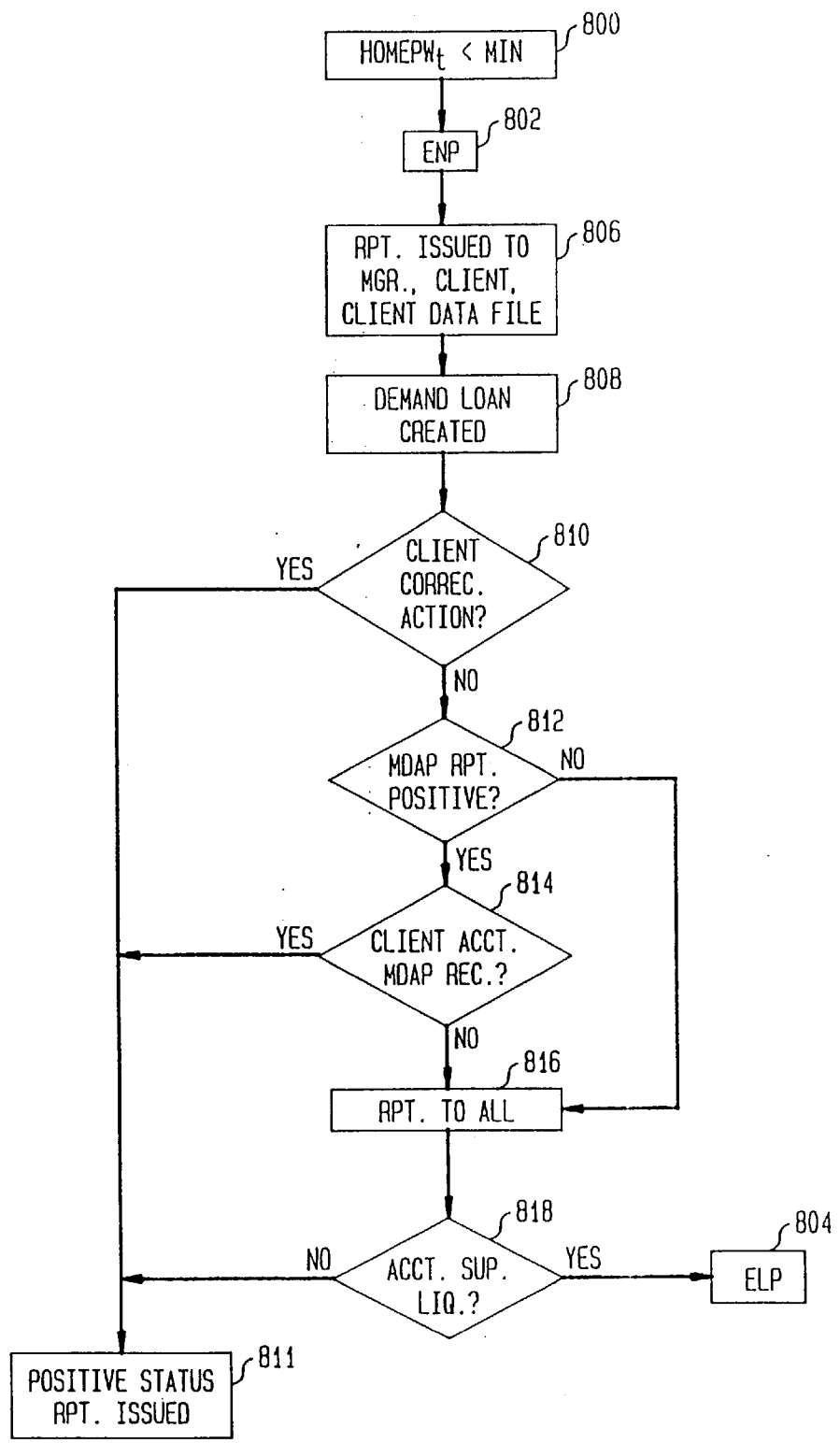
FIG. 12 illustrates a HOME Account Compliance Routine.

FIG. 12 illustrates the HOME Account Compliance Routine (HACR) which includes the Emergency Notification Procedure (ENP). If an account imbalance occurs wherein HOMEPW$_t$ is less than MIM 800, ENP 802 is initiated to notify the client and the financial institution of the account imbalance. Unless the account imbalance is corrected, the Emergency Liquidation Procedure (ELP) is ultimately activated 804.

When an imbalance is determined, i.e. when HOMEPW$_t$<MIM, ENP 802 is initiated and reports citing the imbalance are issued to the account supervisor, the account manager, the client, the client data file, the mortgage servicing department data file and the account history file 806. Simultaneously, a demand loan is created 808 secured by the general obligation of the client and an increased amount of collateral up to the totality of assets in the account and bearing a previously agreed interest rate. The loan will continue to exist until the imbalance cited is corrected and all interest charges are paid in full.

Once the appropriate authorities are apprised of the imbalance and the secured loan is created, one of several events may occur. First, the client may direct that specific corrective action be taken that resolves the account imbalance 810. If the client suggests a corrective action, the system will modify the account to comply with the client's suggestions and if the imbalance is corrected the system will issue a positive status report 811.

If the client does not direct that corrective action be taken, a system recommendation report comprising a PALAO and PIBO is generated using the system default variables instead of any variables input by the client. The principal objective of such a report is to provide the optimum method to satisfy MIM which is achieved when system default variables are used. Provided that corrective action can be recommended that satisfies MIM, the system will then consider and endeavor to maximize the client directed objectives subject to client specified constraints.

If a positive recommendation for corrective action is presented, the client is offered the opportunity to either accept or reject the system recommendations 814. If the client accepts the system recommendations, the account is modified to comply with the recommendations and a positive status report is issued 811. If the client does not accept the system recommendations, a report noting this fact is issued to the parties and data files referred to previously 816. Upon receipt of the report, the account supervisor determines whether to initiate the emergency liquidation procedure 804 or to consult with the client in the hope of encouraging him to either accept the system recommendations or take further action on his own behalf to correct the imbalance 818.

If positive recommendations that completely resolve the imbalance cannot be issued, a report is issued to the parties and data files referred to previously 816 and the account supervisor is given the choice of activating the emergency liquidation procedure or working with the client to correct the imbalance. The likely result is that the account supervisor will be compelled to immediately activate the liquidation procedure 804 since no reformulation of the asset and liability configuration is capable of bringing HOMEPW$_t$ within specified constraints. At this point, the assets will have to be liquidated, loans repaid on a priority basis and further collection actions taken to collect the deficiency.

Emergency Liquidation Procedure

Figure 13:
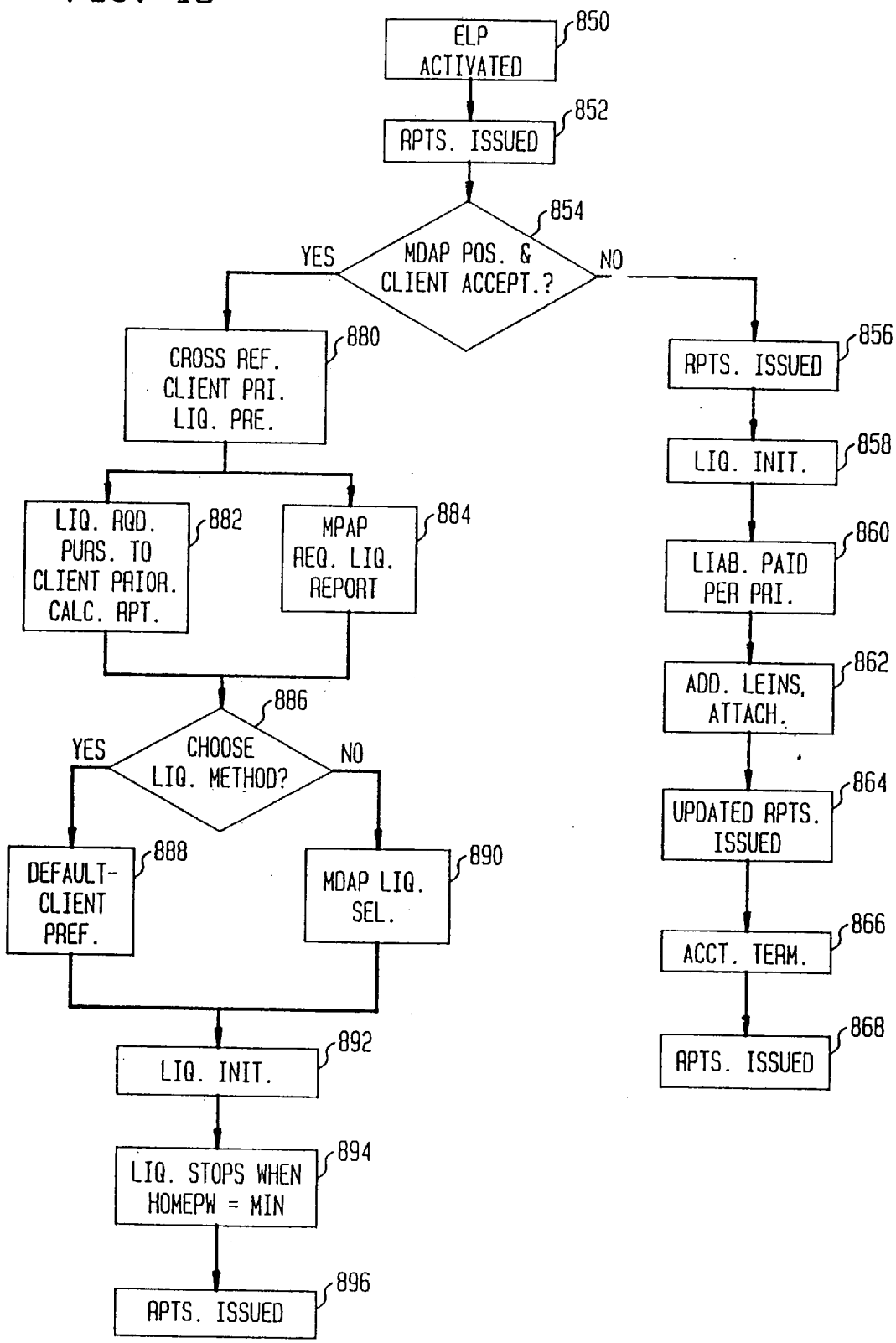
FIG. 13 illustrates an Emergency Liquidation 5 Procedure.

FIG. 13 illustrates the Emergency Liquidation Procedure (ELP). ELP is initiated when the assets in the account are no longer sufficient to meet the financial institution's minimum standards (MIM). When ELP is initiated 850, reports are immediately issued 852 to the client, the account supervisor, the legal and regulatory compliance department, and the corresponding data files. These reports detail the fact that the HOME Account is about to be liquidated because of an imbalance in the account and violation of the HOME Account borrowing agreements.

It is then determined if the system report previously issued for the account and filed in the client data file is positive or negative 854. In the event that it is negative, no potential configuration of the asset and liability holdings of the account is sufficient to satisfy MIM, and a report is issued 856 indicating that a complete liquidation is about to be commenced. The account's assets are then liquidated 858. As assets are liquidated, liabilities are repaid on a priority basis 860 previously established by the financial institution taking into account such factors as the loan-to-value ratio and the liquidity of the asset. To the extent all liabilities cannot be satisfied through the liquidation of asset accounts, liens are established on the client's other assets 862. Periodic update reports are issued to the parties and data files referenced above to advise them of the progress in the liquidation and termination of the account 864. When all of the liabilities have been satisfied, the account is terminated 866.

If the system report is positive and the client is willing to accept the recommendations presented or to make alternative recommendations as to how the account should be liquidated in order to satisfy MIM, then the client priority asset/liability liquidation preference is cross referenced 880. This information was input to the client data file when the account was opened and PALAP initiated.

Two reports are then prepared to be presented to the parties and the pertinent data files 882, 884. The first report is a calculation of the required liquidation pursuant to the client's previously established liquidation preference 882 and the second is the system liquidation report 884. The client is then asked to indicate within a limited time period 886 which liquidation schedule is preferred. If he does not select the system liquidation schedule within the time limit, the HOME Account will be liquidated pursuant to the client's previously established priority liquidation schedule 888.

Once the liquidation method is selected, the liquidation procedure is initiated 892. The liquidation will only proceed to such a point as the HOMEPW is equal to MIM. At that point, the liquidation will terminate and the account will be maintained 894. At that point, the financial institution's report is issued to the client, the manager, the supervisor, the mortgage servicing department and the legal and regulatory department, the client file and the master history file indicating what liquidation transactions took place and the final result of those transactions 896.

Many of the processes described herein may be performed, all or in part, by expert or decision support systems implemented by the financial institution.

While the invention has been described in conjunction with specific embodiments, it is evident that without departing from the scope of the present invention numerous alternatives, modifications, variations and uses will be apparent to those skilled in the art in light of the foregoing description.

I claim:

1. A method for using a computer to operate at least one client financial account comprising the steps of:
   maintaining on said computer system data for each financial account, each financial account comprising at least one investment asset account which receives funds for investment purposes and has an account balance that is periodically updated, a first liability account comprising a loan which is secured with a lien on at least one home and one or more of said investment asset accounts, and at least one additional liability account;
   determining client preferences for operating the account;
   determining an allocation to the investment asset account(s) and the liability account(s) based upon the client preferences;
   allocating funds received in said financial account to pay interest on the loan with at least a portion of the remainder of said funds being allocated based upon the determined allocation rather than amortizing the loan; and
   updating the allocation in accordance with changes to financial and economic variables.

2. The method of claim 1 wherein any additional liability account(s) are paid off before applying any remainder of said funds to increase at least one of said investment asset accounts rather than amortizing the loan.

3. The method of claim 1 further comprising a step of prioritizing the allocation of said investment asset accounts and said liability accounts through the use of a computer-based programming function.

4. The method of claim 3 wherein said programming function is linear.

5. The method of claim 3 wherein said programming function in nonlinear.

6. The method of claim 3 wherein said programming function is an integer function.

7. The method of claim 1 further comprising the step of executing transaction orders on said investment asset accounts and said liability accounts.

8. The method of claim 7 wherein transactions are ordered to be executed by instructions given by the client through a machine interface including an automatic teller machine (ATM), a facsimile machine, or an interactive telephone.

9. The method of claim 7 wherein transactions are ordered to be executed by mail requests from the client.

10. The method of claim 1 further comprising using said computer system for screening said financial account for the purposes of marketing additional products comprising the steps of:
    reviewing a customer data base including client customer information files to determine parameters including the client's assets, liabilities, credit history, cash flow, age;
    matching these parameters to said additional products; and
    notifying the client of the availability of said product(s).

11. The method of claim 1 wherein said at least one additional liability account comprises one or more of a home acquisition loan, a home improvement loan, a home rehabilitation loan, a home equity line of credit, a personal line of credit, an automobile loan, a vacation loan, a student loan, and at least one personal credit account.

12. The method of claim 1 wherein said at least one additional liability account further comprises a margin account.

13. The method of claim 12 further comprising the step of utilizing a portion of said funds received to pay off said margin account.

14. The method of claim 1 wherein said at least one investment asset account comprises a pension and deferred compensation plan, an insurance plan, an annuity, a real estate investment, a trust account, equities, bonds, mutual funds, commodities, futures, options, a margin lending account, a brokerage account and/or a bank account.

15. The method of claim 14 wherein said bank account comprises one or more of a savings account, a NOW account, a checking account and a money market account.

16. The method of claim 1 wherein the funds received into said account are payments made by the account owner.

17. The method of claim 1 wherein the funds received into said account are derived from earnings on said investment asset accounts.

18. The method of claim 1 wherein the funds received are received periodically.

19. A method for using a computer system to operate at least one client financial account comprising the steps of:
    maintaining on said computer system data for each financial account, each financial account comprising at least one investment asset account which receives funds for investment purposes and has an account balance that is periodically updated, and at least one liability account including a loan which is secured with a lien on at least one home and one or more of said investment asset account(s);
    maintaining on said computer system data for funds received into the financial account through loan payments, account cash flows, and account transactions executed on said investment asset account(s) and said liability account(s);
    determining client preferences for operating the account;
    determining a preferred allocation of said received funds to said investment asset account(s) and said liability account(s) based upon the client's preferences;
    allocating said received funds to pay interest on the loan, and using the remaining portion of said funds according to said preferred allocation of said funds; and
    updating the preferred allocation in accordance with changes to financial and economic variables.

20. The method of claim 19 further comprising ordering account transactions by instructions given by the client through a machine interface including an automatic teller machine (ATM), a facsimile machine or an interactive telephone, or through mailed requests.

21. The method of claim 19 further comprising the step of using said computer system to screen said financial account to detect irregularities comprising the steps of:
    reviewing recent account transactions;
    maintaining a record of past account transactions;
    comparing said recent account transactions with said past account transactions; and
    notifying the client if any unusual transactions are detected.

22. The method of claim 21 further comprising performing said screening step continuously.

23. The method of claim 21 further comprising performing said screening step in predetermined periodic intervals.

24. The method of claim 19 further comprising using said computer system to screen said financial account for the purposes of marketing additional products comprising the steps of:
    reviewing a customer data base including client customer information files to determine parameters including the client's assets, liabilities, credit history, cash flow, age;

matching these parameters to said additional products; and notifying the client of the availability of said products.

25. A method of using a computer system to operate at least one client financial account comprising the steps of:

maintaining on said computer data for each financial account, each financial account comprising at least one investment asset account which receives funds for investment purposes and has an account balance that is periodically updated, and at least one liability account including a loan secured by a lien on a residence;

allocating funds received in said financial account to pay interest on the loan and to increase at least one investment asset account or decrease at least one liability account other than the loan secured by the lien, rather than amortize the loan;

calculating an asset loan value for at least said residence equal to the product of the value of the residence and a loan to value ratio; and comparing the asset loan value to the amount of the loan; and if the asset loan value exceeds the amount of the loan then increasing the loan and if the asset loan value is less than the amount of the loan then decreasing the loan so that the loan, does not exceed the asset loan value.

26. The method of claim 25 wherein the steps of calculating the asset loan value and increasing the loan are performed on a regular basis so as to maintain the loan at a substantially constant ratio relative to the value of the residence.

27. A method of using a computer system to operate a client account at a first financial institution when periodic payments are being made to a second institution, a first portion of which pays interest on a loan to a client secured by a residence of the client and a second portion of which amortizes said loan, said method comprising the steps of:

maintaining on said computer system data for an investment asset account at the first financial institution;

maintaining on said computer system data for a credit line at the first financial institution secured by a lien on the residence of the client; and debiting the credit line and crediting the investment asset account by an amount equal to at least the second portion of each periodic payment as said periodic payments are made to the second institution.

28. The method of claim 27 wherein the amount that the credit line is debited is such that the sum of the principal of the loan from the second institution and the credit extended by the first institution is equal to or greater than the principal of said loan at the time the credit line is first debited.

29. The method of claim 27 wherein the client pays to the first financial institution the periodic payments due to the second financial institution and the first financial institution pays the periodic payments to the second financial institution.

30. The method of claim 27 wherein the client pays directly to the second financial institution the periodic payments due to the second financial institution.

31. A method for using a computer-based system to operate at least one client financial account comprising the steps of:

storing in a database information concerning each financial account, each financial account including at least one investment asset account which receives funds for investment purposes, said asset account having an account balance which is updated by the computer system upon receipt of said funds, and at least one liability account including a loan;

determining client preferences for operating the account;

determining a preferred allocation of received funds to said investment asset account(s) and said liability account(s) based upon the client's preferences;

allocating said received funds to pay interest on the loan and allocating the remaining portion of said funds according to said preferred allocation of said funds; and updating the preferred allocation in accordance with changes to financial and economic variables.

32. The method of claim 31 wherein said preferred allocation of received funds to said investment asset account(s) and said liability account(s) is generated by utilizing a computerized financial optimization function based on client risk analysis, account constraints and forecasted econometric and account variables.

33. The method of claim 31 further comprising the steps of:

analyzing said preferred allocation of received funds to said investment asset account(s) and said liability account(s);

generating an improved allocation of received funds to said investment asset account(s) and said liability account(s); and allocating received funds to pay interest on the loan, and allocating the remaining portion of said received funds according to said improved allocation of funds to said investment asset account(s) and said liability account(s) rather than amortizing the loan.

34. The method of claim 31 further comprising the step of maintaining on said computer records of funds received into the financial account wherein said funds comprise loan payments and additional cash flow.

35. A method for using a computer-based financial system comprising the steps of:

establishing at least one client account on said computer system, each client account comprising a loan secured by a mortgage on a home, and at least one more asset or liability;

investing funds received in said client account(s) in said assets or liabilities;

calculating a net asset value for the account equal to the value of any assets including the home less any liabilities including the loan;

comparing the net asset value for the account with a minimum net asset value established for that account;

calculating an expected net asset value at some time in the future for the assets including the home and the liabilities including the loan;

comparing the expected net asset value to a forecasted minimum net asset value established for that account for that future time;

indicating an account imbalance to a user of the system if the client account's net asset value is less than the forecasted minimum net asset value; and automatically allocating funds between said assets and liabilities to endeavor to correct the account imbalance.

36. A method for using a computer-based system to process and supervise at least one client account, each said client account comprising a plurality of sub-accounts including at least one type of asset and one type of liability, said method comprising the steps of:

storing data files and information pertaining to each client account;

investing funds received into the account in said assets and liabilities; and utilizing a computer program for:
(a) establishing for each type of asset a loan to value ratio;
(b) calculating a borrowing power for said client account by calculating for each asset an asset loan value equal to the product of an asset value and a loan to value ratio, summing such asset loan values and deducting all liabilities;
(c) comparing the calculated borrowing power with a minimum;
(d) indicating an account imbalance to a user of the account if the calculated borrowing power for the account is less than the minimum; and
(e) automatically allocating funds between said asset and liability sub-accounts to correct the account imbalance.

37. The method of claim 36 further comprising the steps of:

calculating an expected borrowing power for the client account at some time in the future;

comparing the expected borrowing power calculated for the client account to a forecasted minimum for that account at that future time; and reporting the results of the comparisons.

38. A method in combination with a computer-based system for processing and supervising a plurality of client accounts at an institution providing financial services or financial processing each of which comprises a plurality of financial accounts comprising at least one asset account and one liability account and a liability secured by a mortgage on at least one home and one or more asset accounts comprising the steps of:

inputting and outputting information relating to the client accounts including data relating to values in each client account's asset account(s), liability account(s), and any liability secured by a mortgage;

establishing for each client account a present borrowing power and an expected fixture borrowing power;

allocating funds received in mortgage payments for a client account to pay interest on the liability secured by the mortgage in said client account with at least a portion of the remainder of funds received being used to increase an asset account in said client account rather than amortize the liability secured by the mortgage;

checking that a present borrowing power and an expected future borrowing power for each client account is at least equal to respectively a minimum present borrowing power and minimum the borrowing power specified for that client account by the institution;

indicating an account imbalance to a user of the system if the client account's borrowing power is less than the minimum borrowing power or if the client account's expected borrowing power is less than the minimum future borrowing power; and automatically allocating funds between said asset and liability accounts to endeavor to correct the account imbalance.

39. A method for using a computer system to operate at least one client financial account comprising the steps of:

maintaining a database comprising for each client account at least one investment asset account which receives funds for investment purposes and has an account balance that is periodically updated and at least one liability account including a loan secured by a lien on a residence;

determining for each client financial account a preferred allocation of funds received in said financial account to said investment asset account(s) and said liability account(s);

storing for each client financial account the preferred allocation of funds received;

allocating funds received for the benefit of a client account to pay interest on the loan with at least a portion of the remainder of funds received being used to increase an asset account or pay down a liability account in said client account rather than amortize the loan secured by the mortgage;

calculating a new borrowing power for said financial account by calculating for at least said residence an asset loan value equal to the product of the value of the residence and a loan to value ratio at some time subsequent to establishment of the loan; and comparing the new borrowing power with the amount of the loan, and if the new borrowing power exceeds the amount of the loan then decreasing the loan; and if the new borrowing power is less than the amount of the loan, then increasing the loan, so that the loan does not exceed the new borrowing power.

* * * * *